United States Patent
Boudreau et al.

(10) Patent No.: US 10,375,581 B2
(45) Date of Patent: *Aug. 6, 2019

(54) METHOD AND SYSTEM FOR RADAR DETECTION IN SHARED SPECTRUM

(71) Applicant: Telefonaktiebolaget LM Ericsson (publ), Stockholm (SE)

(72) Inventors: Gary Boudreau, Kanata (CA); Christopher Richards, Ottawa (CA); Virgil Cimpu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,925

(22) Filed: Jan. 12, 2018

(65) Prior Publication Data

US 2018/0139621 A1 May 17, 2018

Related U.S. Application Data

(63) Continuation of application No. 14/897,202, filed as application No. PCT/IB2015/058167 on Oct. 22, 2015, now Pat. No. 9,894,543.

(51) Int. Cl.
*G01S 7/02* (2006.01)
*H04W 16/14* (2009.01)
(Continued)

(52) U.S. Cl.
CPC ............ *H04W 16/14* (2013.01); *G01S 7/021* (2013.01); *H04W 72/0453* (2013.01); *H04W 74/0808* (2013.01); *H04W 74/0816* (2013.01)

(58) Field of Classification Search
CPC . H04W 16/14; H04W 52/367; H04W 72/082; H04W 48/16; H04W 92/02;
(Continued)

(56) References Cited

U.S. PATENT DOCUMENTS 9,894,534 B2 * 2/2018 Boudreau ............... G01S 7/021
2013/0194944 A1 8/2013 Soyak et al.
(Continued)

FOREIGN PATENT DOCUMENTS

WO 2014124131 A2 8/2014

OTHER PUBLICATIONS

Zarikoff, B., et al., "Analysis of Radar Detection Probabilities in Time Division Duplexed Systems," 2012 IEEE International Conference on Communications—Cognitive Radio and Networks Symposium, Jun. 10-15, 2012, Ottawa, Ontario, Canada, 5 pages.
(Continued)

*Primary Examiner* — Olumide Ajibade Akonai
(74) *Attorney, Agent, or Firm* — Withrow & Terranova, PLLC

(57) ABSTRACT

The present disclosure relates to a method and system in a wireless network for radar detection in certain bands e.g. bands normally used for unlicensed access. In one broad aspect, a method is provided for a network node configured to control wireless transmissions in a frequency band also used for radar transmissions. In that method, the network node controls the wireless transmissions using a transmission cycle pattern defined by a transmit on time and a transmit off time. The method includes after a wireless transmission during the transmit-on time of a first transmission cycle, detecting, during the transmit-off time of the first transmission cycle, at least one radar pulse in the frequency band and extending the transmit off time of a second transmission cycle based on the at least one radar pulse detected. Advantageously, in some implementations, extending the transmit off time when one or more radar pulses are detected provides more time to detect a larger number of pulses which as a result, may improve radar detection accuracy.

43 Claims, 9 Drawing Sheets

(51) Int. Cl.
*H04W 72/04* (2009.01)
*H04W 74/08* (2009.01)

(58) Field of Classification Search
CPC . H04W 72/0453; H04W 84/12; H04W 24/02; H04W 88/08; H04L 43/08; H04L 43/16; G01S 7/023
See application file for complete search history.

(56) References Cited

U.S. PATENT DOCUMENTS

| | | |
|---|---|---|
| 2015/0063321 A1 | 3/2015 | Sadek et al. |
| 2015/0098397 A1 | 4/2015 | Damnjanovic et al. |
| 2015/0296508 A1 | 10/2015 | Fan et al. |
| 2016/0087897 A1 | 3/2016 | Hardt |
| 2017/0063665 A1 | 3/2017 | Casebolt et al. |
| 2017/0094556 A1 | 3/2017 | Homchaudhuri et al. |
| 2017/0257773 A1 | 9/2017 | Boudreau et al. |

OTHER PUBLICATIONS

Zarikoff, B., et al., "Detection of Pulsed Radar in a Time Division Duplexed System," 2011 IEEE 73rd Vehicular Technology Conference (VTC Spring), May 15-18, 2011, Budapest, Hungary, 5 pages.

Zhang, Ran et al., "LTE-Unlicensed: The Future of Spectrum Aggregation for Cellular Networks," IEEE Wireless Communications, vol. 22, Issue 3, Jun. 2015, IEEE, pp. 150-159.

Notice of Allowance for U.S. Appl. No. 14/897,202, dated Jul. 13, 2017, 8 pages.

Secondary Notice of Allowance for U.S. Appl. No. 14/897,202, dated Oct. 2, 2017, 8 pages.

International Search Report and Written Opinion for International Patent Application No. PCT/IB2015/058167, dated Jul. 13, 2016, 5 pages.

\* cited by examiner

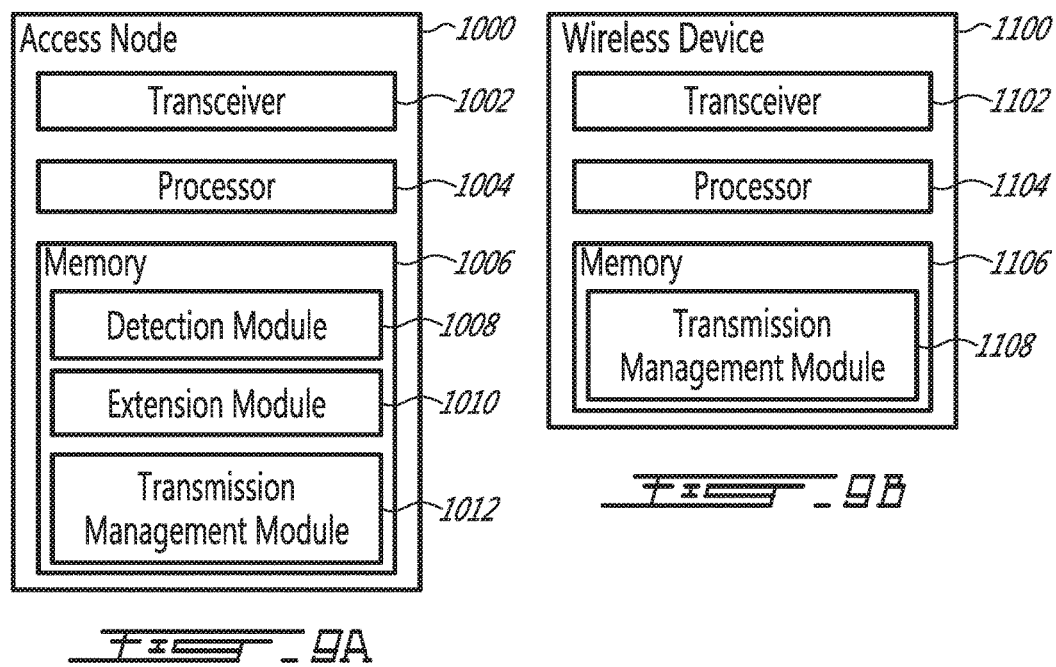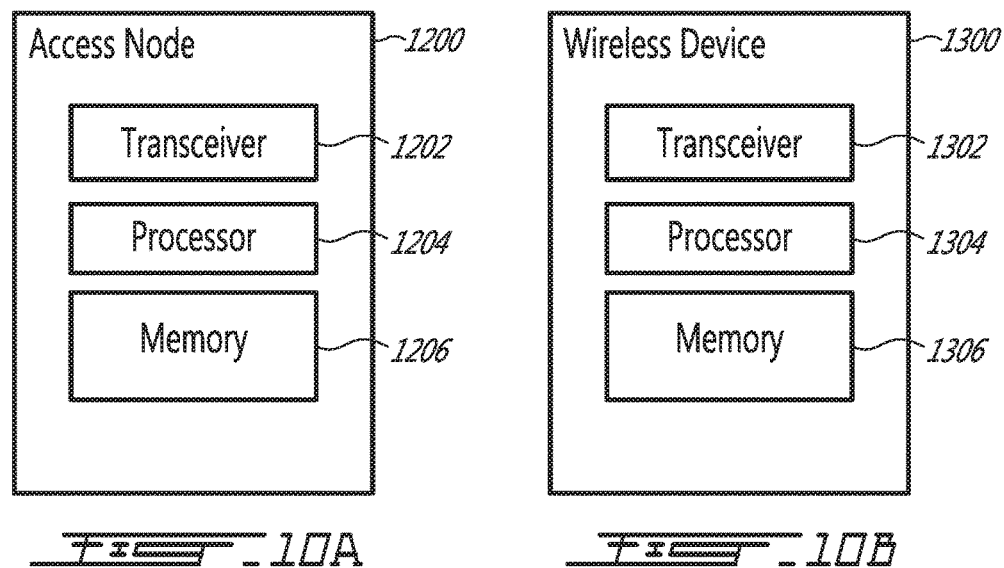

METHOD AND SYSTEM FOR RADAR DETECTION IN SHARED SPECTRUM

RELATED APPLICATIONS

This application is a continuation of U.S. patent application Ser. No. 14/897,202, filed Dec. 9, 2015, now U.S. Pat. No. 9,894,534, which is a 35 U.S.C. § 371 national phase filing of International Application No. PCT/IB2015/058167, filed Oct. 22, 2015, the disclosures of which are hereby incorporated herein by reference in their entireties.

TECHNICAL FIELD

The present disclosure relates to shared spectrum resources and in particular to a method and system for radar detection in spectrum resources shared by multiple wireless communication networks.

BACKGROUND

License Assisted Access (LAA) is a technology being developed and deployed to augment Long Term Evolution (LTE) transmissions on licensed carriers with transmissions in unlicensed bands at both 3.5 GHz and 5 GHz. Specifically the frequency ranges 3550-3700 MHz and 5150-5925 MHz, or parts thereof, is potentially available for LAA for LTE (or LAA-LTE) and/or unlicensed operation. This represents a significant amount of spectrum that can be used by operators to augment their service offerings in licensed bands.

To address concerns that Wi-Fi, currently the dominant technology deployed in the 5 GHz band, may be adversely affected by LAA-LTE, current 3GPP proposals have suggested that LAA-LTE operators manage their channel utilization by setting a maximum transmitter duty cycle or ON duration, so that in environments where there are few Wi-Fi users (e.g. devices and/or Access Points (APs)), LAA-LTE will have more capacity, and in environments where there are many Wi-Fi users, LAA-LTE users will have less bandwidth. To further improve access fairness, LAA proposals also contemplate mandating the use of Listen Before Talk (LBT), a channel sharing functionality used by Wi-Fi devices, to ensures that no other device (e.g. a WiFi or LAA device) is employing the band prior to transmission.

The standardization of LAA by 3GPP is still ongoing, and in the interim, a non-standardized form of unlicensed LTE termed LTE-U is being developed. As currently defined, LTE-U does not require LBT and has a variable transmit ON duration between 4 msec and 20 msec. While they can operate in the 3.5 GHz and 5 GHz bands under a license-exempt or ISM regime, LTE-U implementations must share the unlicensed spectrum with existing mobile and other incumbent services. From that perspective, unlicensed access is still viewed as complementary and most implementations are expected to continue to rely on licensed allocations in view of the ever increasing demands for wireless broadband access.

However, one of the potential drawbacks of employing these unlicensed bands is that significant portions of them have incumbent radar operators which must be given priority. This means that any new unlicensed operation must defer to incumbent radar operators by monitoring for radar signals and ceasing to transmit in the unlicensed band for a period of at least 30 minutes when a radar signal is detected. In the 5 GHz unlicensed band for example, the frequency bands from 5250 to 5730 MHz fall within the Unlicensed National Information Interchange (U-NII)-2 and UNII-2 extension bands and as such, are subject to Dynamic Frequency Selection (DFS) requirements. In the U.S., the requirements for detecting and avoiding interference with radar signals in the unlicensed bands are specified by the Federal Communications Commission (FCC) under the designation Dynamic Frequency Selection (DFS). DFS detection requirements are formulated in terms of power signature, number of pulses, pulse width and pulse repetition interval as well as radio actions such as channel scanning times, and times when devices must keep off the channel when a radar signal has been detected.

Existing solutions for DFS detection have been developed for Wi-Fi applications that employ unlicensed spectrum. However to date, no specific solutions for LTE or LAA have been developed. Existing DFS implementations in Wi-Fi chipsets are not optimized to recognize LAA/LTE signals and avoid false positives for example, due to the presence of LTE signals such as the Common or Cell-specific Reference Signals (CRS), Channel State Information Reference Signals (CSI-RS), Sounding Reference Signals (SRS), Positioning Reference Signals (PRS) or (Primary or Secondary) Synchronization Signals (PSS/SSS). Furthermore, unless a significant fraction of the DFS radar pulses are detected with a defined pulse width and pulse repetition interval (PRI), Wi-Fi signals as well as LAA or LTE-U signals (e.g. from other access points or eNodeBs) could trigger a false detection. For radar type 5 this can be very challenging since the pulse width and pulse repetition interval can vary over the duration of the pulse sequence. Furthermore for LTE-U implementations that do not employ LAA-based LBT, the agreed minimum transmit on time is 20 msec. As such, it is possible that the DFS radar signal could be completely missed since there are modes or radar types for which the entire pulse sequence is less than 3 msec.

Accordingly, to address some or all of the drawbacks noted above, it would be desirable to have a radar detection scheme adapted for shared access over an unlicensed band.

SUMMARY

The present disclosure relates to a method and system for radar detection in certain bands e.g. bands normally used for unlicensed access.

In one broad aspect of the present disclosure, there is provided a method for a network node configured to control wireless transmissions between the node and wireless devices in a wireless network using a transmission cycle pattern defined by a transmit on time and a transmit off time, where the wireless transmissions occur in a frequency band used for radar transmissions. The method includes after a wireless transmission during the transmit-on time of a first transmission cycle, detecting, during the transmit-off time of the first transmission cycle, at least one radar pulse in the frequency band and extending the transmit off time of a second transmission cycle based on the at least one radar pulse detected. The second transmission cycle may be the same as the first transmission cycle or a subsequent transmission cycle.

In one implementation, extending the transmit off time of the second transmission cycle includes reducing the transmit-on time of the second transmission cycle, reducing a duty cycle of the second transmission cycle or extending a transmission cycle period for the second transmission cycle. In another implementation, the method also includes detecting a number of radar pulses in a transmit off time of the second transmission cycle and prohibiting wireless transmissions for a predetermined time when the number of radar pulses detected is greater than a threshold.

In yet another implementation, the transmit off time of the second transmission cycle is extended by a first duration and the method further includes extending a transmit off time of a third transmission cycle by a second duration greater than the first duration when a number of radar pulses detected in a transmit off time of the second transmission cycle is lower than a threshold. In yet another implementation, the method further includes repeating the detecting and extending steps until one of the transmit off time is greater than a maximum transmit off time and the at least one radar pulse detected is greater than a threshold.

In yet another implementation, the method also includes repeating the detecting and extending steps for a predetermined number of times which may be dependent on a type of the at least one radar pulse detected. In one example, after the predetermined number of times, the method may include resetting a transmit off time of a subsequent transmission cycle when a number of the at least one radar pulse detected is lower than a threshold. In another example, after the predetermined number of times, the method may include incrementally reducing a transmit off time of one or more subsequent transmission cycles when a number of the at least one radar pulse detected is lower than a threshold until the transmit off time reaches a reset value.

In yet another implementations, detecting the at least one radar pulse includes detecting the at least one radar pulse in a channel of the frequency band overlapping with a channel used for the wireless transmission. In yet another implementation, the detecting and extending is performed for at least one secondary cell in which a channel used for wireless transmissions in the frequency band overlaps with a channel used for radar transmissions. In one example, detecting at least one radar pulse in the frequency band includes detecting the at least one radar pulse in one of the at least one secondary cell, and the method may further include prohibiting wireless transmissions for a predetermined time in each of the at least one secondary cells when the at least one radar pulse detected is greater than a threshold. In another example, extending the transmit off time includes extending the transmit off time in each of the at least one secondary cell such that the transmit on times in the at least one secondary cell do not overlap.

In yet another implementation, the method further includes sending a message to one or more wireless devices, the message being indicative of the at least one radar pulse detected or indicative of a request to stop transmitting. The message may be sent in a broadcast channel, a control channel, a traffic channel, in a Master Information Block (MIB), a System Information Block (SIB) or a reference signal.

In another broad aspect of the present disclosure, there is provided a network node configured to control wireless transmissions between the node and wireless devices in a wireless network using a transmission cycle pattern defined by a transmit on time and a transmit off time, where the wireless transmissions occur in a frequency band used for radar transmissions. The node includes circuitry containing instructions which, when executed, cause the node to perform any of the steps and/or method embodiments described above.

In yet another broad aspect of the present disclosure, there is provided a non-transitory computer readable memory configured to store executable instructions for a network node, the executable instructions when executed by a processor cause the node to perform any of the steps and/or method embodiments described above.

In another broad aspect of the present disclosure, there is provided a network node configured to control wireless transmissions between the node and wireless devices in a wireless network using a transmission cycle pattern defined by a transmit on time and a transmit off time, and where the wireless transmissions occur in a frequency band used for radar transmissions. The node includes a transceiver, a processor and memory containing a detection module configured to detect, after a wireless transmission during the transmit-on time of a first transmission cycle and during the transmit-off time of the first transmission cycle, at least one radar pulse in the frequency band. The memory further contains an extension module configured to extend the transmit off time of a second transmission cycle based on the at least one radar pulse detected. The second transmission cycle may be the same as the first transmission cycle or a subsequent transmission cycle.

In one implementation, the extension module is configured to extend the transmit off time of the second transmission cycle by either reducing the transmit-on time of the second transmission cycle, reducing a duty cycle of the second transmission cycle or extending a transmission cycle period for the second transmission cycle. In another implementation, the detection module is further configured to detect a number of radar pulses in a transmit off time of the second transmission cycle and prohibit wireless transmissions for a predetermined time when the number of radar pulses detected is greater than a threshold. In yet another implementation, the transmit off time of the second transmission cycle is extended by a first duration, and the extension module is further configured to extend a transmit off time of a third transmission cycle by a second duration greater than the first duration when a number of radar pulses detected in a transmit off time of the second transmission cycle is lower than a threshold. In yet another implementation, the detection and extension modules are configured to repeat the detecting and extending until one of the transmit off time is greater than a maximum transmit off time and the at least one radar pulse detected is greater than a threshold. In yet another implementation, the detection and extension modules are configured to repeat the detecting and extending for a predetermined number of times which may be dependent on a type of the at least one radar pulse detected.

In yet another implementation, the extension module is configured to, after the predetermined number of times, reset a transmit off time of a subsequent transmission cycles when a number of the at least one radar pulse detected is lower than a threshold. In yet another implementation, the extension module is further configured to, after the predetermined number of times, incrementally reduce a transmit off time of one or more subsequent transmission cycles when a number of the at least one radar pulse detected is lower than a threshold until the transmit off time reaches a reset value.

In yet another implementation, in order to detect the at least one radar pulse, the detection module is further configured to detect the at least one radar pulse in a channel of the frequency band overlapping with a channel used for the wireless transmission. In yet another implementation, the detection module is further configured to detect and extend for at least one secondary cell in which a channel used for wireless transmissions in the frequency band overlaps with a channel used for radar transmissions. In one example, to detect at least one radar pulse in the frequency band, the detection module may be further configured to cause the node to detect the at least one radar pulse in one of the at least one secondary cell, and to prohibit wireless transmissions for a predetermined time in each of the at least one secondary cells when the at least one radar pulse detected is greater than a threshold. In another example, to extend the transmit off time, the extension module may be further configured to extend the transmit off time in each of the at least one secondary cell such that the transmit on times in the at least one secondary cell do not overlap.

In yet another implementation, the memory further contains a transmission module configured to send a message to one or more wireless devices, indicative of the at least one radar pulse detected or a request to stop transmitting. The message may be sent in a broadcast channel, a control channel, a traffic channel, in a Master Information Block (MIB), a System Information Block (SIB) or a reference signal.

Advantageously, in some implementations, extending the transmit off time when one or more radar pulses are detected provides more time to detect a larger number of pulses which in turn may reduce or avoid false radar detection positives. Extending the transmit off duration can also be beneficial to more accurately detect radar type 5 signals since the pulse width and pulse repetition interval (PRI) can vary over the duration of the pulse sequence (up to 12 seconds).

In other implementations, a node controlling transmissions in a wireless network may be capable of further improving its radar detection accuracy by notifying wireless device(s) in its coverage (within coverage of a primary and/or secondary cell) that a radar signal is in the process of being detected and/or to request that they stop their (uplink) transmissions until the access node can finally determine whether a radar signal is actually present or not. By instructing or requesting devices in coverage to stop transmitting as soon as possible, the node can facilitate completion of the detection process and further improve its radar detection capability.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIGS. 9A-9B show a block diagram of exemplary embodiments of an access node and a wireless device configured in accordance with principles of the present disclosure; and FIGS. 10A-10B show a block diagram of other exemplary embodiments of an access node and a wireless device configured in accordance with principles of the present disclosure.

DETAILED DESCRIPTION

The present disclosure is directed to a method and system for radar detection in certain bands and/or channels used for radar signals (e.g. bands normally used for unlicensed access. The description that follows describes how a node (e.g. an access node) in a wireless network operating in an unlicensed band (e.g. a License Assisted Access (LAA)—Long Term Evolution (LTE) Radio Access Network (RAN)) can control transmissions in the band so as to properly detect incumbent radar signals and avoid interference therewith. According to principles of the present disclosure, an access node in the LAA-LTE RAN network (e.g. an eNodeB) is configured with a transmission cycle pattern defined by a transmit ON time duration and a transmit OFF time duration adapted to facilitate radar detection. However, those having ordinary skill in the relevant art will readily appreciate that the principles described herein may equally apply to other types of networks. For example, the wireless network may also include other $3^{rd}$ Generation Partnership Project (3GPP) networks (e.g. Universal Mobile Telecommunications System UMTS, LTE-Advanced (LTE-A)), LTE-Unlicensed (LTE-U), $4^{th}$ Generation (4G) networks or $5^{th}$ Generation (5G) networks. Generally, the wireless network may include any current or future wireless network infrastructure adapted to or configured to control its transmissions with a repetitive or cyclical transmission pattern defined with ON and OFF durations, with or without a licensed anchor band (so called "standalone" or single carrier access network).

The examples provided herein apply to radar detection in an unlicensed band. As such, it is assumed that the channels and spectrum used by radar systems are also used for unlicensed access by, for example, wireless networks (and related services) such as those mentioned above or networks which use contention-based transmissions. Examples of wireless networks which use some form of media access method and/or transmissions based on contention include Wireless (e.g. Wi-Fi) Local Area Networks (WLANs), Wireless Personal Area Networks (WPANs), Wireless Metropolitan Area Networks (WMANs) as well as CT2Plus and Digital Enhanced Cordless Telecommunications (DECT), etc (hereinafter referred to as WLAN networks). However, it is important to note that the present disclosure is not limited to unlicensed bands as such but is generally applicable to any band or channel in which it would be desirable to detect and/or avoid interference with radar signals or other repetitive signals or pulses (e.g. signals with a higher priority).

Figure 1:
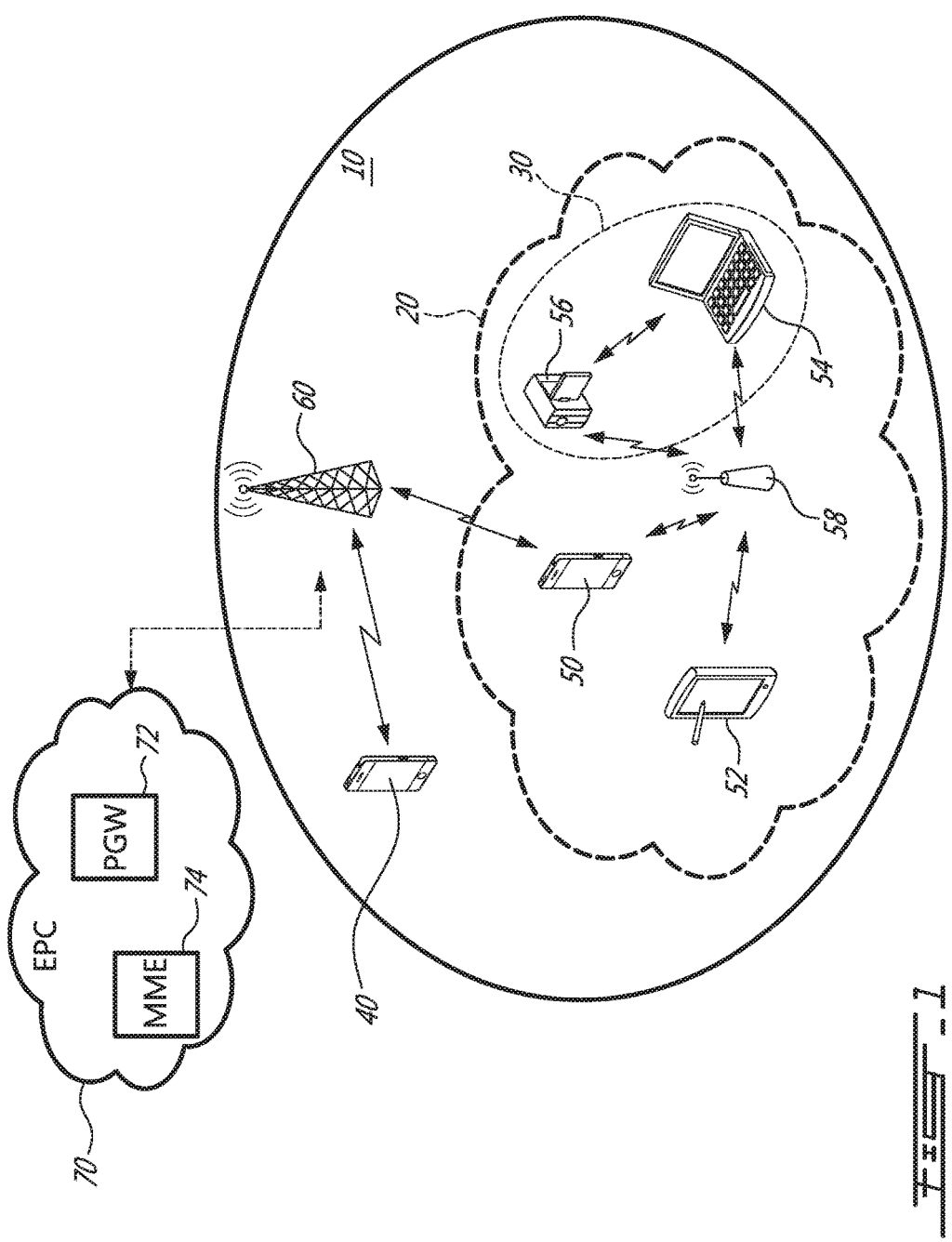
FIG. 1 illustrates one example of a Long Term Evolution (LTE) Radio Access Network (RAN) configured to detect radar signals in a frequency band shared with Wireless Local Area Networks (WLANs), in accordance with the principles described herein.

Referring now to FIG. 1, there is shown one example of an LAA-LTE RAN 10 in which an access node 60 is configured to control transmissions in an unlicensed band so as to detect radar signals more accurately (further details below). As is conventional for LAA operation, the unlicensed band is used to operate a (secondary) carrier to add capacity to a (primary) carrier operating in licensed spectrum (e.g. an LTE carrier). Operation of the primary licensed carrier may be under the control of the access node 60 or another node in the LAA-LTE RAN 10.

The access node 60 is an eNodeB but in other implementations, the access node 60 may be a Node B (NB), evolved Node B (eNB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 60 is configured to control transmissions to or from UEs in the LTE RAN 10 but other nodes in the LTE RAN 10, a Core Network (CN) 70 or in a network outside of a RAN/CN infrastructure (e.g. an Internet Protocol (IP) node in an IP network) may be configured for that purpose. In other implementations, a wireless device or UE (for example, a relay node UE) may be configured to control transmissions to or from other wireless devices in a wireless network. It is to be understood that the functionality described herein in relation to nodes that control transmissions in a wireless network (e.g. an access node) may also equally apply to wireless devices configured as such.

In FIG. 1, the access node 60 provides wireless devices within its coverage (e.g. devices 40, 50) with access to network services in one more core networks 70, in this example, an Evolved Packet Core (EPC) network which includes a Mobility Management Entity 74 and a Packet Data Network (PDN) Gateway (PGW) 72. Each wireless device 40, 50 is configured for wireless communication in the LAA-LTE RAN 10 (e.g. as a User Equipment (UE) and may be of any type, including, for example a wireless terminal (also known as a mobile station, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a hart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device.

In the example of FIG. 1, the LAA-LTE RAN 10 shares the unlicensed band with WLANs 20, 30 for transmissions involving some of the wireless devices in its coverage (e.g. wireless device 50). Generally, the WLANs 20, 30 may each include any number of wireless devices communicating directly or via an Access Point (AP) with other devices in the same or different networks. In the example of FIG. 1, WLAN 20 is shown to include WLAN devices 52, 54, AP 58 as well as wireless device 50 while WLAN 30 includes WLAN devices 54 and 56. Other network configurations for WLANs 20, 30 or other types of networks or devices which may share unlicensed spectrum resources with device 50 in the LAA-LTE RAN 10 are possible.

As is conventional, devices 50, 52, 54 and AP 58 in WLAN 20 and devices 54, 56 in WLAN 30 (herein generically referred to as WLAN devices) are configured to share a band of spectrum using some form of media access method and/or transmissions based on contention. As is well-known, there are many examples of such contention-based approaches. Examples include Listen-Before-Talk (LBT), Carrier Sense Multiple Access (CSMA)—with Collision Detection (CSMA-CD), CSMA with Collision Avoidance (CSMA-CA), etc. Using a contention-based method, a WLAN device 50, 52, 54, 56, 58 will try to determine whether another transmission is progress in the channel or band used. This determination may be based on the detection of a carrier wave, signal or energy in the channel or band of interest. If a carrier or energy is detected in the band or channel of interest (in another fully or partially overlapping channel or band), the WLAN device 50, 52, 54, waits for the transmission in progress to finish before initiating its own transmission.

Although the example of FIG. 1 shown the LAA-LTE RAN 10 sharing spectrum resources with WLANs 20, 30 (e.g. for wireless device 50), it is important to note that co-existence with other (incumbent) networks in the unlicensed band is not necessary. According to principles of the present disclosure, the access node 60 is configured to control transmissions whether or not the unlicensed band used in the LAA-LTE RAN 10 is shared with other networks and/or services. To illustrate these two possibilities, FIG. 1 shows wireless device 50 as part of WLANs 20,30, sharing spectrum resources with devices 52, 54, 56, 58 while wireless device 40, in a different location (outside the coverage of WLANs 20, 30), does not.

As a result, the wireless devices 40, 50 described in the embodiments herein may, but do not need to be configured for operation on multiple different wireless networks. In the example of FIG. 1, wireless device 50 is configured as a dual-mode device (i.e. configured as a UE for operation in the LAA-LTE RAN 10 as well as a WLAN device for operation in WLANs 20, 30) while wireless device 40 is configured as a UE for operation in the LAA-LTE RAN 10 only. For clarify, the principles of the present disclosure apply whether or not other networks co-exist with the LAA-LTE RAN 10 in the unlicensed band and whether or not wireless devices 40, 50 in the LAA-LTE RAN 10 are configured as single-mode or multi-mode devices.

As is well known, for networks such as the LAA LTE RAN 10 operating in an unlicensed band, radar detection may be mandated to ensure that the equipment does not interfere with radar systems. Dynamic Frequency Selection (DFS) is an example of a mechanism mandated by the Federal Communications Commission (FCC). When a radar signal is detected in a particular channel, a DFS compliant device is required to cease transmission on the channel for a 30 minute non-occupancy period. In some implementations, the DFS device will proceed to select a new frequency or channel for continued operation that does not interfere with the radar signal detected.

A radar signal consists of a sequence of one or more bursts of pulses repeated after some duration (called the sweep time). The FCC defines different types of radar signals based on the number of bursts in the sequence, the number of pulses in a burst, the Pulse Width (PW) and/or the Pulse Repetition Interval (PRI). The FCC also mandates certain radio actions for DFS compliance including the channel non-occupancy period mentioned above that follows positive radar detection. In Tables 5 and 6 of a document entitled "Compliance Measurement Procedures For Unlicensed-National Information Infrastructure Devices Operating in the 5.25-5.35 GHz and 5.47-5.725 GHz Bands Incorporating Dynamic Frequency Selection (May 2015), hereby incorporated by reference in its entirety, the FCC provides details of various radar test waveforms that are used to determine DFS compliance. These tables are reproduced below.

TABLE 5

Short Pulse Radar Test Waveform

| Radar Type | Pulse Width (μsec) | PRI (μsec) | Number of Pulses | Minimum Percentage of Successful Detection | Minimum Number of Trials |
|---|---|---|---|---|---|
| 0 | 1 | 1428 | 18 | See Note 1 | See Note 1 |
| 1 | 1 | Test A: 15 unique PRI values randomly selected from the list of 23 PRI values in Table 5a  Test B: 15 unique PRI values randomly selected within the range of 518-3066 μsec, with a minimum increment of 1 μsec, excluding PRI values selected in Test A | Roundup $\left\{ \left(\frac{1}{360}\right) \cdot \left(\frac{19 \cdot 10^6}{PRI_{\mu sec}}\right) \right\}$ | 60% | 30 |
| 2 | 1-5 | 150-230 | 23-29 | 60% | 30 |
| 3 | 6-10 | 200-500 | 16-18 | 60% | 30 |
| 4 | 11-20 | 200-500 | 12-16 | 60% | 30 |
| Aggregate (Radar Types 1-4) | | | | 80% | 120 |

Note 1:
Short Pulse Radar Type 0 should be used for the detection bandwidth test, channel move time, and channel closing time tests.

TABLE 6

Long Pulse Radar Test Waveform

| Radar Type | Pulse Width (μsec) | Chirp Width (MHz) | PRI (μsec) | Number of Pulses per Bursts | Number of Bursts | Minimum Percentage of Successful Detection | Minimum Number of Trials |
|---|---|---|---|---|---|---|---|
| 5 | 50-100 | 5-20 | 1000-2000 | 1-3 | 8-20 | 80% | 30 |

As it can be seen from the above tables, for DFS compliance, UEs or wireless devices operating in a frequency band used by incumbent radar systems must be capable of properly detecting and avoiding interference with radar signals such as those listed in Tables 5 and 6. Under FCC regulations, when a radar signal is detected, a device must cease transmission on that channel for at least the mandated 30 minute non-occupancy period. Depending on the implementation, it may be important for nodes that control transmissions in an unlicensed band (e.g. the access node 60) to avoid false detections in order to reduce the impact on network capacity and throughput. In the LAA LTE RAN 10 of FIG. 1, false detections may be caused by existing Wi-Fi signals (e.g. from other APs) such as Wi-Fi beacons, and/or other LTE signals (e.g. from other eNodeBs or UEs) such as Common or Cell-specific Reference Signals (CRS), Channel State Information Reference Signals (CSI-RS), Sounding Reference Signals (SRS), Positioning Reference Signals (PRS) or (Primary or Secondary) Synchronization Signals (PSS/SSS). Unless a significant number of pulses are detected with, for example, a defined pulse width and pulse repetition interval, these signals could cause false detection positives, resulting in unnecessary transmission interruptions. In addition, in implementations where Time Division Multiplexing (TDD) is used (such as in the LAA LTE RAN 10), it may be difficult, if not impossible for a node and/or device to detect radar pulses during the transmit ON duration because receive signals cannot be detected while the node/device is actively transmitting.

Figure 2:
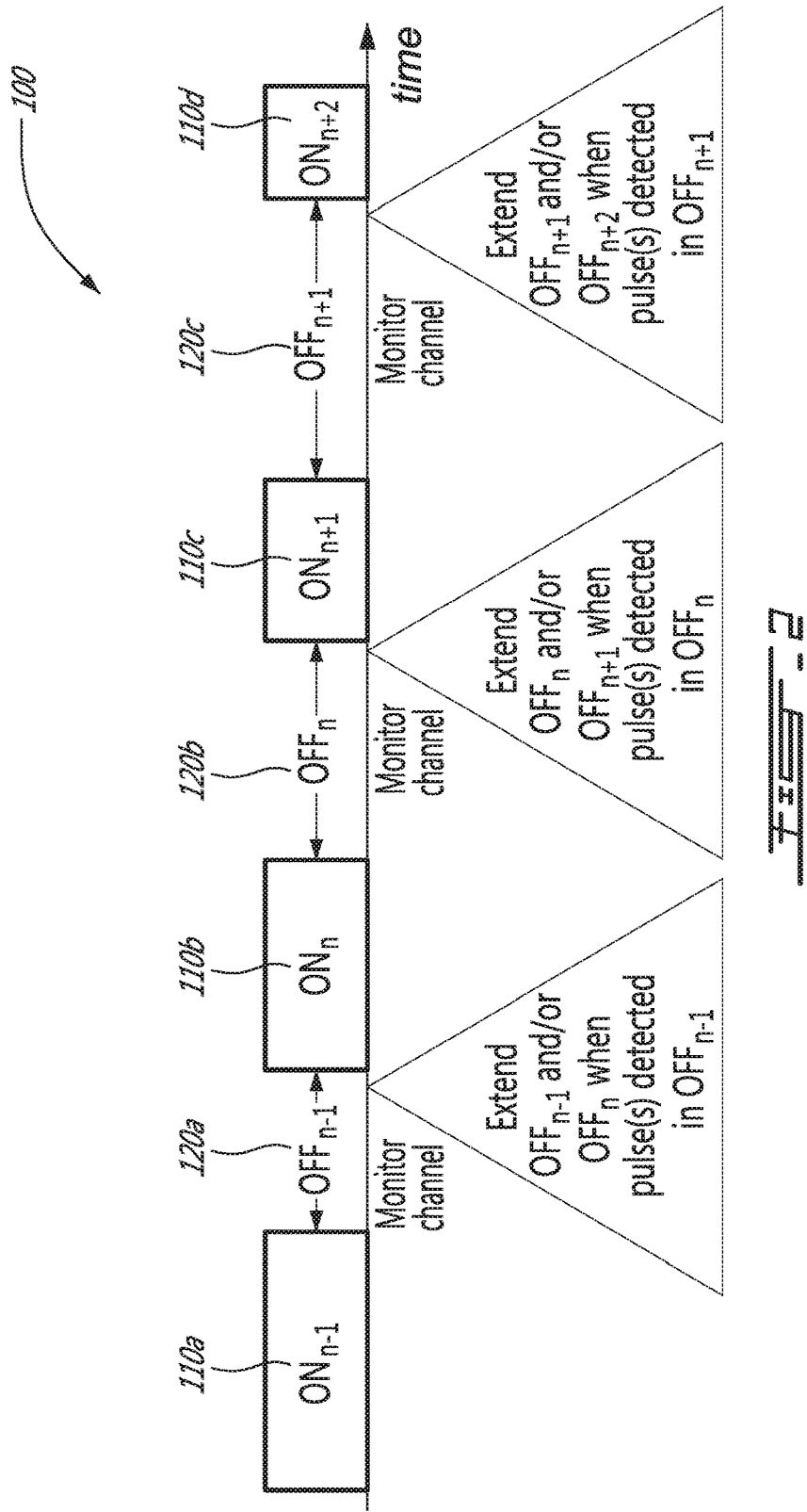
FIG. 2 illustrates a time diagram example of the transmission cycle pattern for the RAN of FIG. 1, adapted for radar detection in accordance with the principles described herein.

According to principles of the present disclosure, nodes controlling transmissions in an unlicensed band are configured to adaptively adjust their transmit OFF duration as necessary to improve radar detection accuracy. Turning now to FIG. 2, there is shown an example of an adaptive (i.e. adjustable) transmission cycle pattern 100 for the LTE RAN 10 of FIG. 1 for operation in an unlicensed band to facilitate radar detection in that band. The adaptive transmission cycle pattern 100 used by the access node 60 (which could be a Carrier Sense Adaptive Transmission (CSAT) or other time-domain multiplexing transmission pattern) is defined by a transmit ON duration or duty cycle for LTE (downlink and uplink) transmissions and a transmit OFF duration during which LTE transmissions are gated and, in implementations where the unlicensed band is shared, during which other networks or services (e.g. WLAN devices 50, 53, 54, 56, 58 in WLANs 20, 30) may be configured to transmit. FIG. 2 shows four ON durations 110a, 110b, 110c, 110d during which the access node 60 can schedule LTE transmissions and three OFF durations 120a, 120b, 120c during which the channel is not occupied by the LAA LTE RAN 10 and potentially available to other networks (e.g. WLANs 20, 30). The combination of the ON and OFF durations defines a transmission cycle period or in the specific example of FIGS. 1 and 2, an LAA-LTE period.

When one or more radar pulses are detected during the transmit OFF duration of a particular transmission cycle, the access node 60 is configured to extend the transmit OFF duration of the same or subsequent transmission cycles so as to enable the detection of more pulses. For example, when one or more radar pulses are detected in OFF duration 120a (OFF$_{n-1}$), the access node 60 is configured to extend the same OFF duration 120a (OFF$_{n-1}$) or a subsequent OFF duration 120b, 120c (OFF$_n$, OFF$_{n+1}$) in an attempt to detect more pulses and make a better decision as to whether a radar signal is present or not. In some implementations, if after extending an OFF duration (e.g. OFF duration 120a), the number of pulses detected is insufficient, the access node 60 is configured to progressively extend the OFF duration of subsequent transmission cycles (e.g. OFF durations 120b, 120c) either until the number of pulses detected is sufficient to declare proper radar detection, or until the extended OFF duration has reached a maximum value but the number of pulses detected is still insufficient. At that point, access node 60 may determine that no radar was detected and may reset the transmit OFF duration of the next transmission cycle to an initial value (further details below).

In some implementations, extending the transmit OFF duration is beneficial to help deterministically exclude existing Wi-Fi and/or LTE signals from other APs or nodes which might otherwise cause false detection positives. Extending the transmit OFF duration can also be beneficial to more accurately detect radar type 5 signals since the pulse width and pulse repetition interval (PRI) can vary over the duration of the pulse sequence (up to 12 seconds). Furthermore for LTE-U implementations that do not employ LAA based LBT and where the agreed minimum transmit ON duration is 20 msec, it is possible that the DFS radar signal could be completely missed without any extension of the transmit OFF duration since there are modes or radar types for which the entire pulse sequence is less than 3 msec and as such, could occur entirely within the transmit ON duration. As mentioned above, at least in TDD implementations, a node (such as the access node 60) would not be able to detect radar pulses while it is actively transmitting. Therefore, by extending the OFF duration of the same or subsequent transmission cycles, the access node 60 has more time to detect a larger number of pulses before making a final determination that a radar signal has been detected and taking the necessary action to avoid interference (e.g. stop transmissions and/or select a different, non-interfering channel).

There are many ways in which the transmit OFF duration of a transmission cycle pattern can be adjusted. In some implementations, there are three parameters that can be adaptively controlled to adjust the transmit OFF duration:
 (i) the transmit ON duration (Tx_on),
 (ii) The transmission cycle period (Tperiod), also known as the total transmit ON/OFF duration, and
 (iii) The transmission duty cycle (Duty_cycle)

The relationship between these parameters and the transmit OFF duration (Tx_off) is given by:

$$Tperiod = Tx\_on + Tx\_off \quad (1)$$

$$Duty\_cycle = Tx\_on / Tperiod \quad (2)$$

$$Duty\_cycle = Tx\_on / (Tx\_on + Tx\_off) \quad (3)$$

Based on the above relationships (1), (2) and (3), any change in the transmit ON duration (Tx_on), the transmission cycle (Tperiod) or the transmission duty cycle (Duty_cycle) results in a corresponding adjustment of the transmit OFF duration (Tx_off). In one implementation, the transmit OFF duration (Tx_off) is extended by extending the transmission cycle period (Tperiod) and scaling Tx_on proportionally. In another, the transmit OFF duration (Tx_off) is extended by reducing the transmit ON duration (Tx_on) or the duty cycle (Duty_cycle) while keeping Tperiod fixed.

In yet other implementations, the transmit OFF duration (Tx_off) is adjusted by fixing one parameter and varying another. An example is shown in Table A below where a parameter in the first column is fixed while a parameter in the second column (the independent parameter) is varied. The variation causes a corresponding variation of the corresponding parameters (the dependent parameters) listed in the third column.

TABLE A

| Fixed Parameter | Independent Parameter | Dependent parameters |
| --- | --- | --- |
| Tperiod | Tx_on | Duty Cycle, Tx_off |
| Duty cycle | Tx_on | Tperiod, Tx_off |
| Tx_on | Duty Cycle | Tperiod, Tx_off |

In some implementations, the extent by which the transmit OFF duration 120b, 120c is adjusted depends on the type of radar pulses detected.

Figure 3:
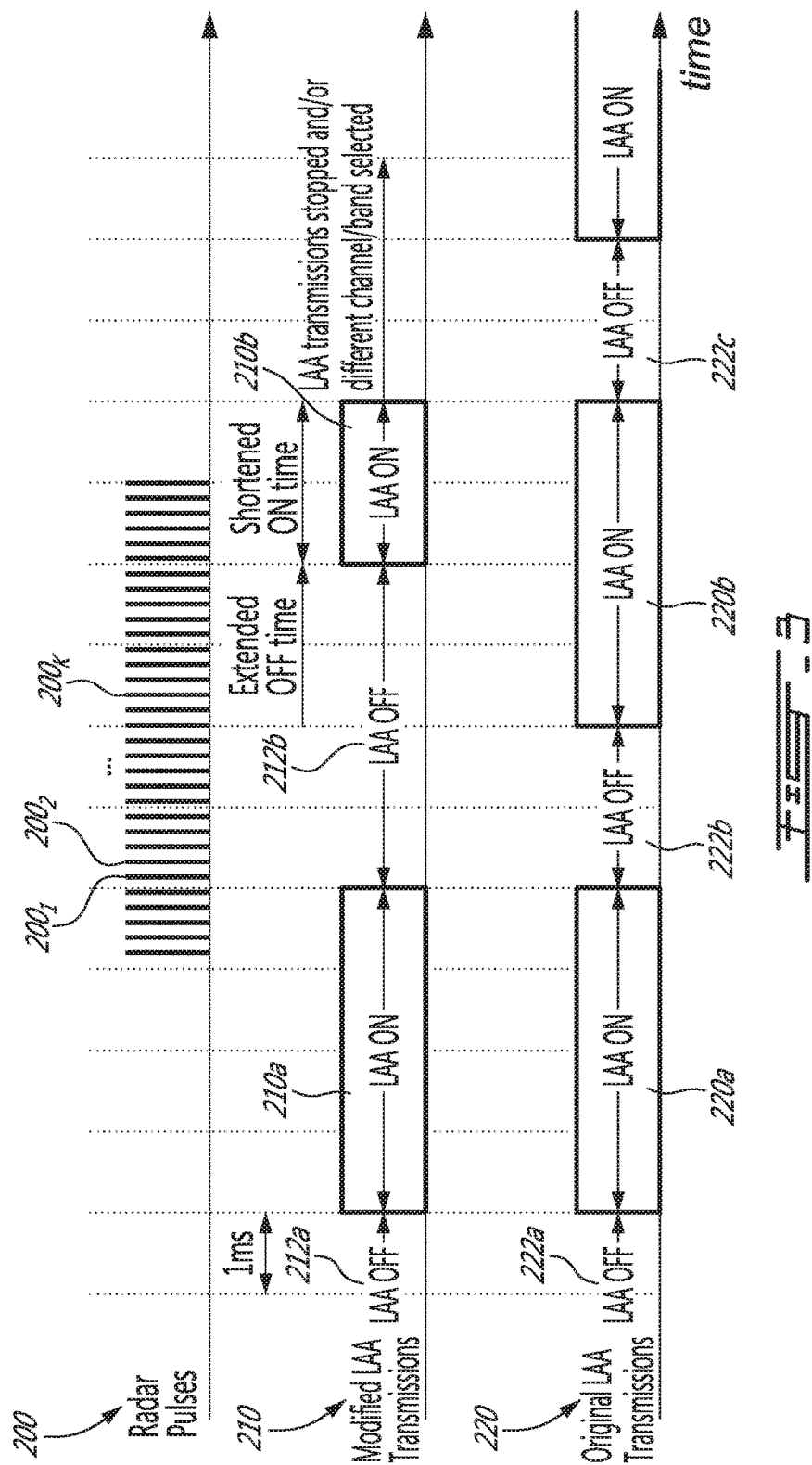
FIG. 3 illustrates a time diagram example of the transmission cycle pattern of FIG. 2 adapted for detection of a type 2 radar signal, in accordance with the principles described herein.

FIG. 3 illustrates a time diagram example of a transmission cycle pattern 210 for an access node (e.g. access node 60 of FIG. 1) adapted for detecting type 2 radar pulses 200 in an unlicensed band or channel. The transmission cycle pattern 210 of this example consists of two transmit ON durations 210a, 210b, during which the access node can schedule transmissions and transmit OFF durations 212a, 212b during which the access node monitors for pulses 200$_1$, 200$_2$, 200$_K$. As explained above, the transmit OFF duration 212a, 212b is also a time during which the access node is not transmitting or scheduling transmissions and where the band/channel is normally available to other networks or services (e.g. other LAA transmissions or WLANs 20, 30). For clarity, the (original) transmission cycle pattern 220 (with ON durations 220a, 220b, 220c and non-extended OFF durations 222a, 222b, 222c) is also shown.

When one or more radar pulses 200 are detected in a transmit OFF duration 212b but the number detected is insufficient (for e.g. less than a predetermined/configurable number K), the access node is configured to extend the transmit OFF duration 212b to increase the likelihood of detecting the required number of pulses 200$_1$, 200$_2$, 200$_K$ to reliably declare detection of a radar signature during the same OFF duration 212b. The extension can be carried out by, for example, extending the transmission cycle period (Tperiod), reducing the transmit ON duration (Tx_on) or reducing the duty cycle (Duty_cycle) of the next transmission cycle. During the extended transmit OFF duration 212b, the access node monitors the channel for the required number of radar pulses 200$_1$, 200$_2$, 200$_K$. If the total number of pulses detected becomes sufficient (e.g. equal or greater than K pulses), the access node determines that it has detected a radar signal and either stops scheduling transmissions or and/or selects a different, non-interfering band or channel. If the number of pulses detected is still insufficient (less than K pulses), the access node may either determine that no proper radar signal was detected or continue to extend the transmit OFF duration of one or more subsequent transmission cycle(s) in an attempt to detect the required number of pulses $200_1$, $200_2$, $200_K$. In that scenario, if after a number of extensions, the number of pulses detected is still insufficient, the access node may determine that no proper radar signal was detected, reset the transmit OFF duration of the next transmission cycle and continue scheduling transmissions during transmit ON durations and continue to monitor for pulses 200 during transmit OFF durations.

Figure 4:
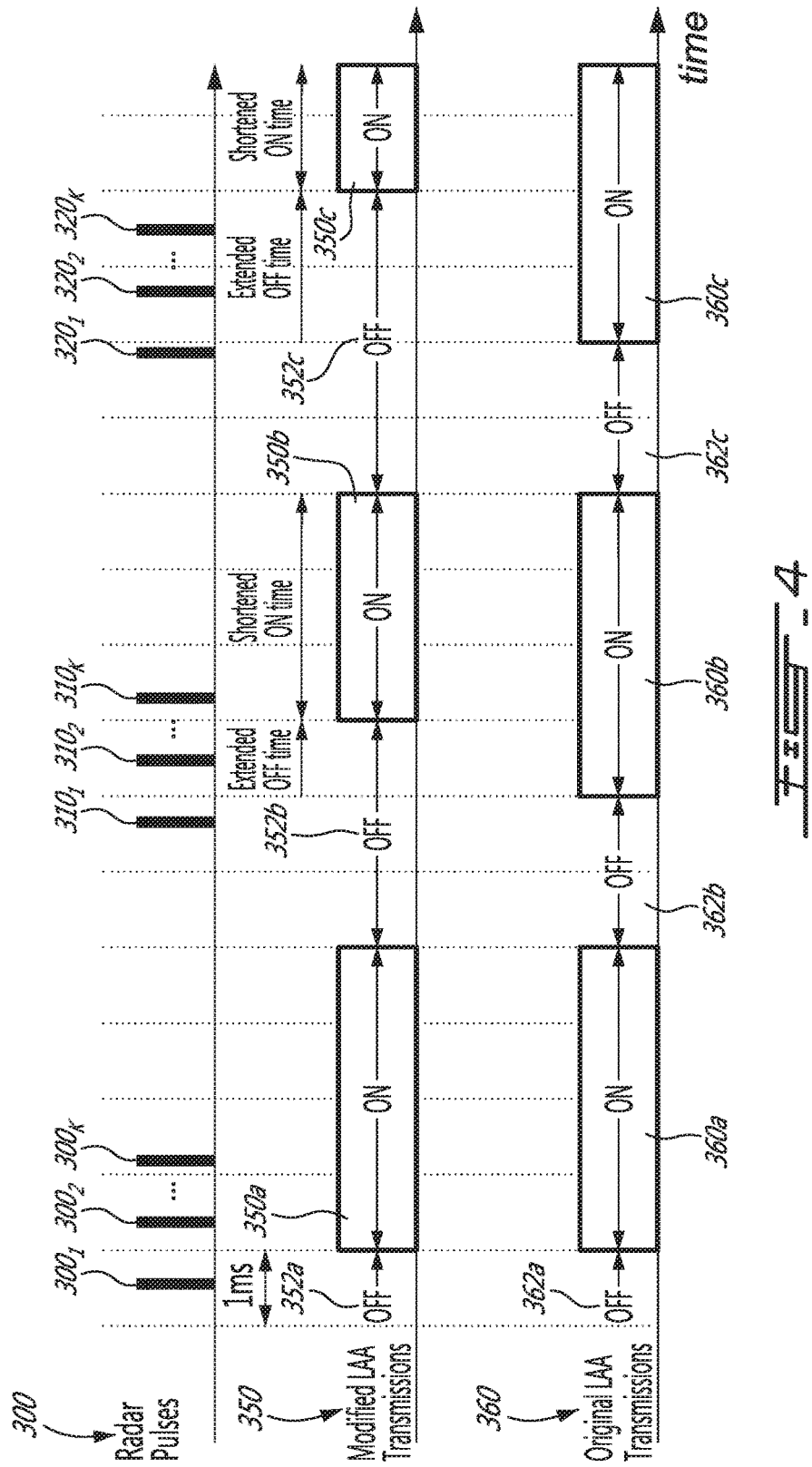
FIG. 4 illustrates another time diagram example of the transmission cycle pattern of FIG. 2 adapted for detection of a type 5 radar signal, in accordance with the principles described herein.

FIG. 4 illustrates a time diagram example of a transmission cycle pattern 350 for the access node 60 of FIG. 1, adapted for detecting type 5 radar pulses 300. The transmission cycle pattern 350 of this example consists of three transmit ON durations 350a, 350b, 350c during which the access node can schedule transmissions and three transmit OFF durations 352a, 352b, 352c during which the access node monitors for pulses 300. For clarity, the (original) transmission cycle pattern 360 (with non-extended OFF durations 362a, 362b, 362c) is also shown.

When one or more radar pulses $300_1$, $300_2$, $300_k$ are detected in the transmit OFF duration 350a of a transmission cycle but the number detected is insufficient (e.g. less than K pulses), the access node 60 extends the transmit OFF duration 352b of a subsequent transmission cycle using any one of the methods described above. During the extended transmit OFF duration 350b, the access node monitors for the required number of pulses $310_1$, $310_2$, $310_k$. If, during the extended transmit OFF duration 352b, the number of pulses detected is insufficient, the access node 60 extends the transmit OFF duration 352c of the next transmission cycle further (compared to the previous extended transmit OFF duration 352b) and monitors for the required number of pulses $320_1$, $320_2$, $320_k$. This process can be repeated progressively for a number of times until the number of pulses detected is sufficient to declare proper radar detection, or until the transmit OFF duration 350a, 350b, 350c has reached a maximum value but the number of pulses detected is still insufficient. At that point, the access node may determine that no radar was detected and may reset the transmit OFF duration of the next transmission cycle to an initial value (not shown).

Figure 5:
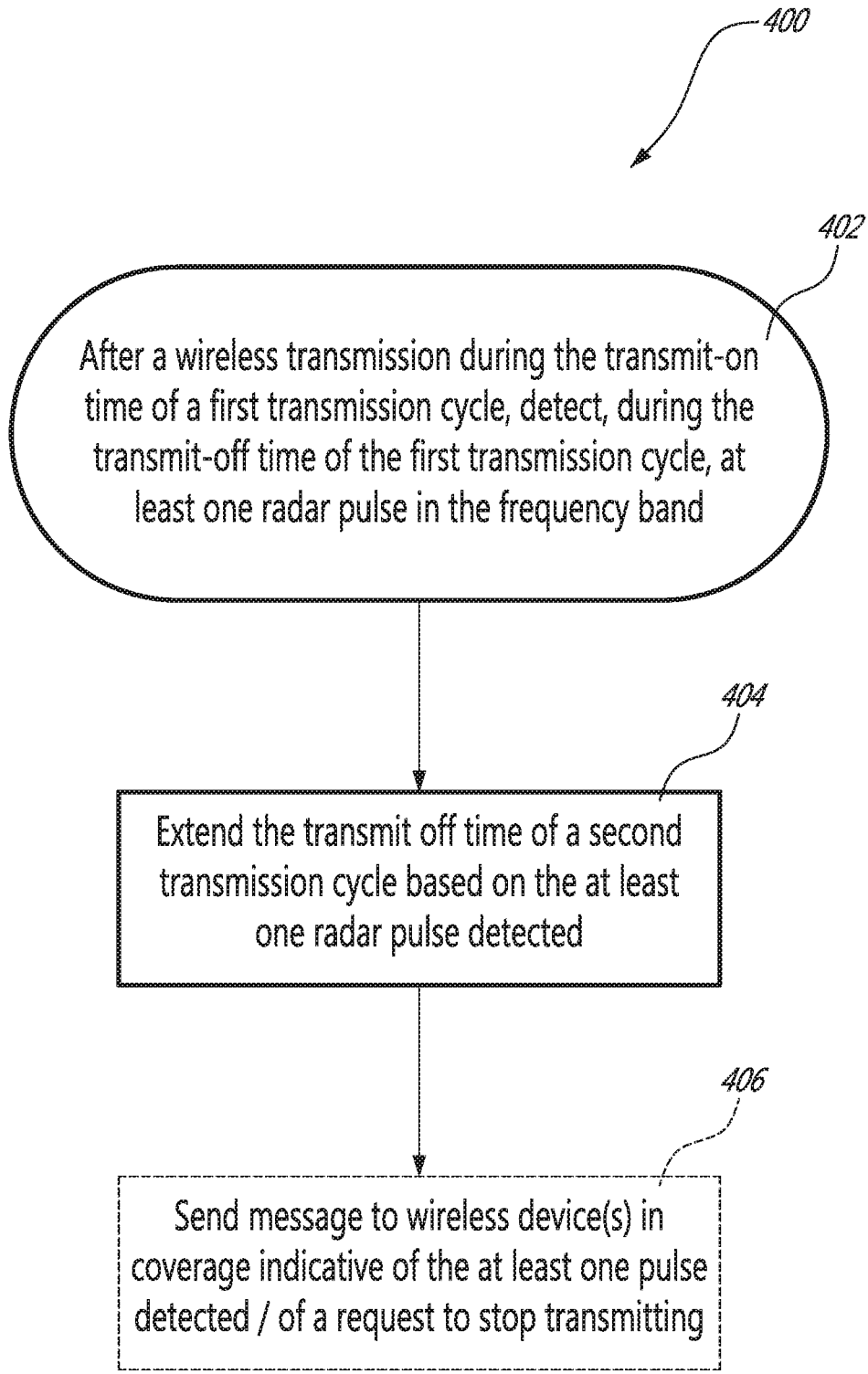
FIG. 5 illustrates an example of a method for an access node in the LTE network of FIG. 1 configured to detect radar signals in accordance with the principles described herein.

FIG. 5 illustrates a flow chart example of a method 400 for an access node (e.g. the access node 60) in the LAA LTE RAN 10 of FIG. 1 to detect radar signals in accordance with the principles described herein. In this example, the access node is assumed to control uplink and downlink transmissions in a frequency band that is also used for radar transmissions. The method begins at step 402 where after a wireless transmission during the transmit ON time of a first transmission cycle, the access node detects, during the transmit OFF time of the first transmission cycle, at least one radar pulse in the frequency band. At step 404, the access node extends the transmit OFF time of a second transmission cycle based on the at least one radar pulse detected. Optionally, at step 406, the access node sends a message to wireless device(s) within its coverage (or within coverage of a primary and/or secondary cell associated with or under the control of the access node) that a radar signal is in the process of being detected and/or requesting the wireless device(s) to stop transmitting (further details below).

Figure 6:
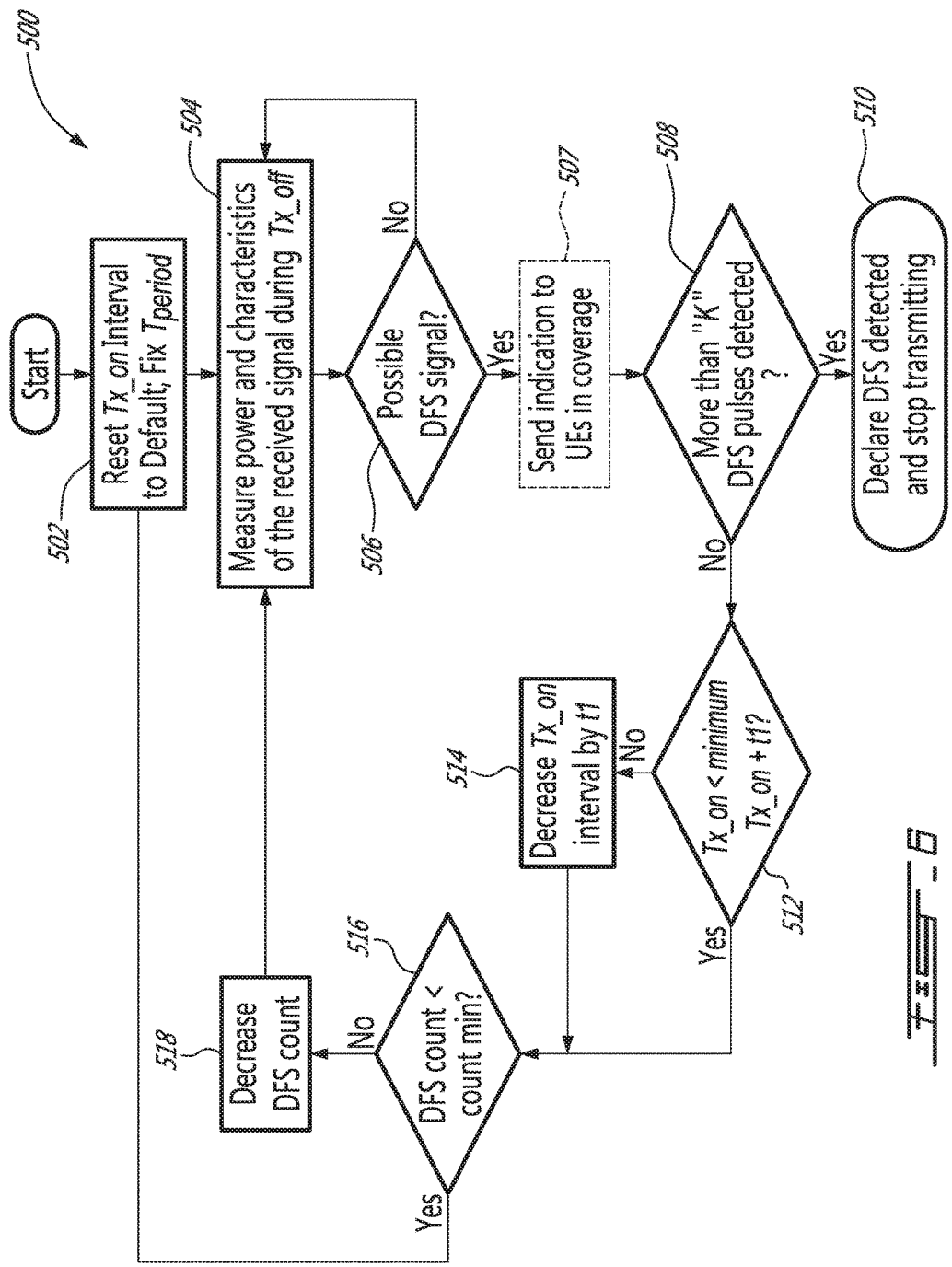
FIG. 6 shows another example of a method for an access node in the LTE network of FIG. 1 configured to detect radar signals in accordance with the principles described herein.

FIG. 6 shows an example of another method 500 for an access node (e.g. the access node 60) configured to detect radar signals in accordance with the principles described herein. In this particular example, the access node progressively extends the transmit OFF duration (Tx_off) by progressively reducing the transmit ON duration (Tx_on) while keeping the transmission cycle period (Tperiod) fixed. Specifically at step 502, the access node resets the transmit ON duration (Tx_on) to a default or initial value and sets the transmission cycle period (Tperiod) to a fixed value. At step 504, the access node measures the power (and other characteristics) of the signal received during the transmit OFF duration (Tx_off) to possibly detect one or more pulses above a defined power threshold and having a pulse width within a defined range (e.g. between $T_{min\_duration}$ and $T_{max\_duration}$). In some implementations, $T_{min\_duration}$, and/or $T_{max\_duration}$ are configurable or predetermined values which may vary based on the type of radar signal or pulses being detected. In yet some other implementations, the access node correlates the measurements against known LTE signals (e.g. CRS, CSI-RS, SRS, DMRS and other LTE reference signals or Wi-Fi beacons to eliminate them as possible sources of false detection alarms. If, at step 506, the measurements are indicative of a possible radar (DFS) signal, for example, if one or more pulses with the required power level and pulse width exhibit the pulse repetition pattern of one of the defined radar test waveforms shown in Tables 5 and 6 above, the access node may optionally send at step 507 an indication to wireless device(s) within its coverage (or within coverage of a primary and/or secondary cell) that a radar signal is in the process of being detected and/or requesting the wireless device(s) to stop transmitting. At step 508, the access node determines whether more than K pulses were detected. The parameter K is configurable but in some implementations, K is set to a value in the range of 5 to 10. If more than K pulses were detected, the access node determines at step 510 that a radar signal (with characteristics matching one of the defined radar test waveforms of Tables 5 and 6 above) was detected and stops transmitting in the channel or band over which the pulses were detected.

On the other hand, if less than K pulses were detected, the method continues at step 514 where the access node extends the transmit OFF duration (Tx_off) by decreasing the transmit ON duration (Tx_on) of a subsequent transmission cycle by a t1 duration (e.g. 1 msec) while keeping $T_{period}$ fixed to determine if K or more pulses in one of the candidate radar type waveforms can be detected. The Tx_on reduction is performed unless at step 512 the access node determines that Tx_on is lower than a minimum value (minimum Tx_on+ t1). In the example method of FIG. 6, the access node uses a counter, DFS count, to control the number of times or frames for which the pulse detection and transmit ON reduction process outlined in steps 504-514 is repeated (to progressively extend the transmit OFF duration). The parameter DFS count is also configurable but in some implementations, DFS count is set to a value in the range of 1 to 50 frames (e.g. 1 to 50 msec) for radar types 1 to 4 and up to 12 seconds for radar type 5. The access node decrements DFS count by one at step 518 for each repetition until the counter DFS count reaches a minimum value count_min. If, during one repetition, the access node determines that DFS count is less than count_min, the method goes back to step 502 where the transmit ON duration (Tx_on) is reset to its initial value (thereby resetting the transmit OFF duration) or gradually increased again over a number of frames/transmission cycles before steps 504-514 can be repeated again.

It is important to note that the method of FIG. 6 may include different steps for performing the pulse detection and transmit ON reduction process described herein. For example, different steps (other than steps 504, 506, 508) could be used by the access node to monitor for the predetermined number (e.g. K) of pulses. Also, instead of decrementing DFS count to control the number of repetitions, the access node may instead be configured to increment the DFS count counter until it reaches a maximum value (indicative of the maximum number of transmit OFF extensions allowed). Other implementations are possible.

Figure 7:
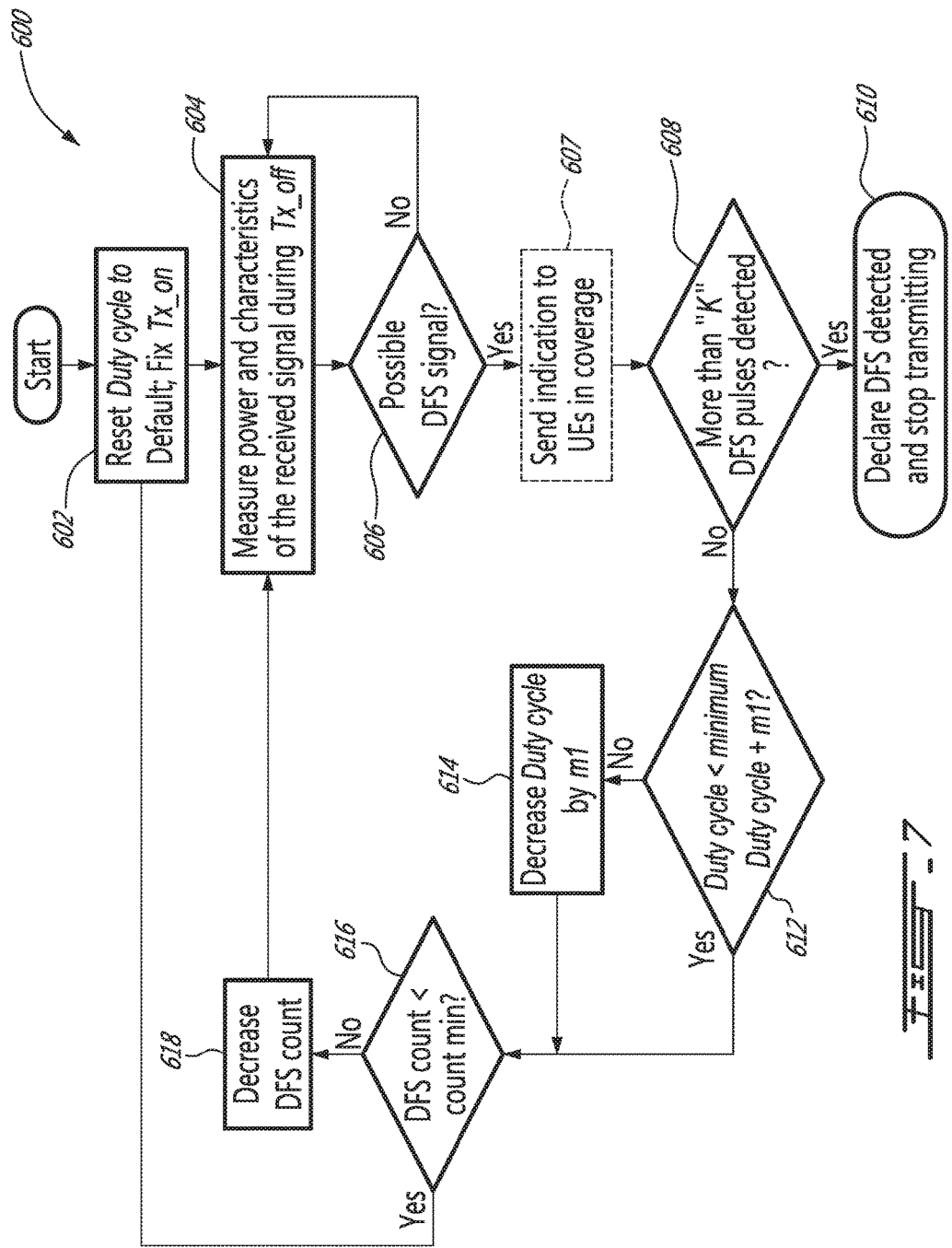
FIG. 7 shows yet another example of a method for an access node in the LTE network of FIG. 1 configured to detect radar signals in a wireless network in accordance with the principles described herein.

FIG. 7 shows an example of yet another method 600 for an access node (e.g. the access node 60) configured to detect radar signals in accordance with the principles described herein. In contrast to the example of FIG. 6, the access node in this example progressively extends the transmit OFF duration (Tx_off) by progressively reducing the duty cycle (Duty_cycle) while keeping the transmit ON duration (Tx_on) fixed. Specifically, at step 602, the access node resets the duty cycle (Duty_cycle) to a default or initial value and sets the transmit ON duration (Tx_on) to a fixed value. At step 604, the access node measures the power (and other characteristics) of the signal received during the transmit OFF duration (Tx_off) to possibly detect one or more pulses over a defined power threshold and having a pulse width within a defined range (e.g. between $T_{min\_duration}$ and $T_{max\_duration}$). In some implementations, $T_{min\_duration}$, and/or $T_{max\_duration}$ are configurable or predetermined values which may vary based on the type of radar signal or pulses being detected. In yet some other implementations, the access node correlates the measurements against known LTE signals (e.g. CRS, CSI-RS, SRS, DMRS and other LTE reference signals) or Wi-Fi beacons to eliminate them as possible sources of false detection alarms.

If, at step 606, the measurements are indicative of a possible radar (DFS) signal, for example, if one or more pulses with the required power level and pulse width exhibit the pulse repetition pattern of one of the defined radar test waveforms shown in Tables 5 and 6 above, the access node may optionally send at step 607 an indication to wireless device(s) within its coverage (or within coverage of a primary and/or secondary cell) that a radar signal is in the process of being detected and/or requesting the wireless device(s) to stop transmitting. At step 608, the access node determines whether more than K pulses were detected. The parameter K is configurable but in some implementations, K is set to a value in the range of 5 to 10. If more than K pulses were detected at step 608, the access node determines that a radar signal (with characteristics matching one of the defined radar test waveforms of Tables 5 and 6 above) and declares a DFS signal detection at step 610 and stops transmitting in the channel or band over which pulses were detected.

On the other hand, if less than K pulses were detected, the method continues at step 514 where the access node extends the transmit OFF duration (Tx_off) by decreasing the duty cycle (Duty_cycle) of a subsequent transmission cycle by an m1 duration while keeping Tx_on fixed to determine if K or more pulses in one of the candidate radar type waveforms can be detected. The Duty_cycle reduction is performed unless at step 612 the access node determines that Duty_cycle is lower than a minimum value (minimum Duty_cycle+m1). Similarly to the example FIG. 6, a counter (DFS count) is also used in this example method to control the number of times for which the pulse detection and duty cycle reduction process outlined in steps 604-614 is repeated (to progressively extend the transmit OFF duration). The parameter DFS count is also configurable but in some implementations, DFS count is set to a value in the range of 1 to 50 frames (e.g. 1 to 50 msec) for radar types 1 to 4 and up to 12 seconds for radar type 5. The access node decrements DFS count by one at step 618 for each repetition until DFS count reaches a minimum value of count_min. If, during one repetition, the access node determines that DFS count is less than count_min, the method goes back to step 602 where the duty cycle (Duty_cycle) is reset to its initial value (thereby resetting the transmit OFF duration) or gradually increased again over a number of frames/transmission cycles before steps 604-614 can be repeated again.

The method of FIG. 7 may also equally include different steps for performing the pulse detection and duty cycle reduction process described herein. For example, different steps (other than steps 604, 606, 608) could be used by the access node to monitor for the predetermined number (e.g. K) of pulses. Also, instead of decrementing DFS count to control the number of repetitions, the access node may instead be configured to increment the DFS count until it reaches a maximum value (indicative of the maximum number of transmit OFF extensions allowed). Other implementations are possible.

The examples provided above are generally applicable to access nodes in an LAA LTE RAN configured to control transmissions in one unlicensed channel (i.e. a secondary carrier) used in combination with another (primary) licensed carrier For example, the principles of the present disclosure are applicable to network environments where Carrier Aggregation (CA) is used (i.e. legacy LTE on a licensed band primary carrier in combination with LAA or LTE-U on an unlicensed band secondary carrier. In addition, the same concepts could be applied in LAA environments where multiple secondary carriers in unlicensed spectrum are configured to provide additional downlink or uplink capacity to a (primary) carrier operating in licensed spectrum. For such implementations, particularly where the secondary carriers operate on the same frequency or channel, it may be beneficial to coordinate the secondary cell transmit OFF durations so as to increase the time during which the channel(s) are monitored for radar detection.

Figure 8A:
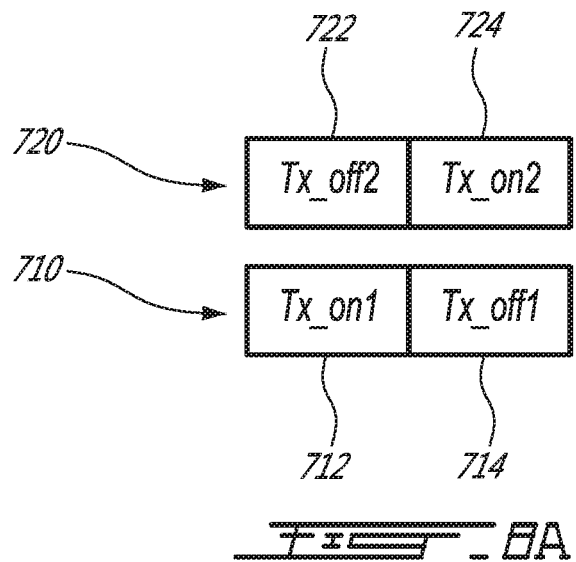
FIGS. 8A-8B show examples of transmission cycle patterns adapted for radar detection in secondary cells in accordance with the principles described herein.

FIG. 8A shows a coordination example between two secondary carriers in secondary cells SCell1, SCell2, in accordance with the principles described herein. In that example, the secondary cells SCell1, SCell2 are configured with a respective transmission cycle pattern 710, 720 defined by a transmit ON duration 712, 724 and a transmit OFF duration 714, 722. The transmit OFF duration 714 of the SCell1 transmission cycle pattern 710 is alternated with the transmit OFF duration 722 of the SCell2 transmission cycle pattern 720 such that when one SCell is transmitting (e.g. SCell1), the other secondary cell (e.g. SCell2) is not transmitting and can monitor the channel for radar pulses.

In a variation of that example, the transmit ON duration 724 used in secondary cell SCell2 can be scaled by a factor q based on the transmission duty cycle 710 used in secondary SCell1. In a specific example, the transmit ON duration 724 is given by:

$$SCell2\ transmit\ ON\ duration = q \times (1 - SCell1\ duty\ cycle).$$

In that example, the value of q can be a value between zero and one. A value of 1 means that only one secondary cell SCell1, SCell2 will be monitoring at any given time. Any other value means that both secondary cells SCell, SCell2 may be monitoring at the same time (i.e. may have overlapping transmit OFF durations 714, 722) which may be desirable in some implementations. With at least one secondary cell monitoring the channel for pulses at any given time, the likelihood of detecting radar signals in the channel is improved.

Note that in some implementations, it is assumed that transmit OFF coordination is performed on secondary cells that operate on the same frequency. However, in other implementations, it is entirely possible to apply the same coordination in cells operating on different or partially non-overlapping frequencies. In yet other implementations, the coordination is performed by a (coordination) node configured to control transmissions in the secondary cells. In yet other implementations, the coordination is performed by an access node configured to serve a primary cell (PCell) in a licensed band of spectrum. Other possibilities exist for the coordination.

Figure 8B:
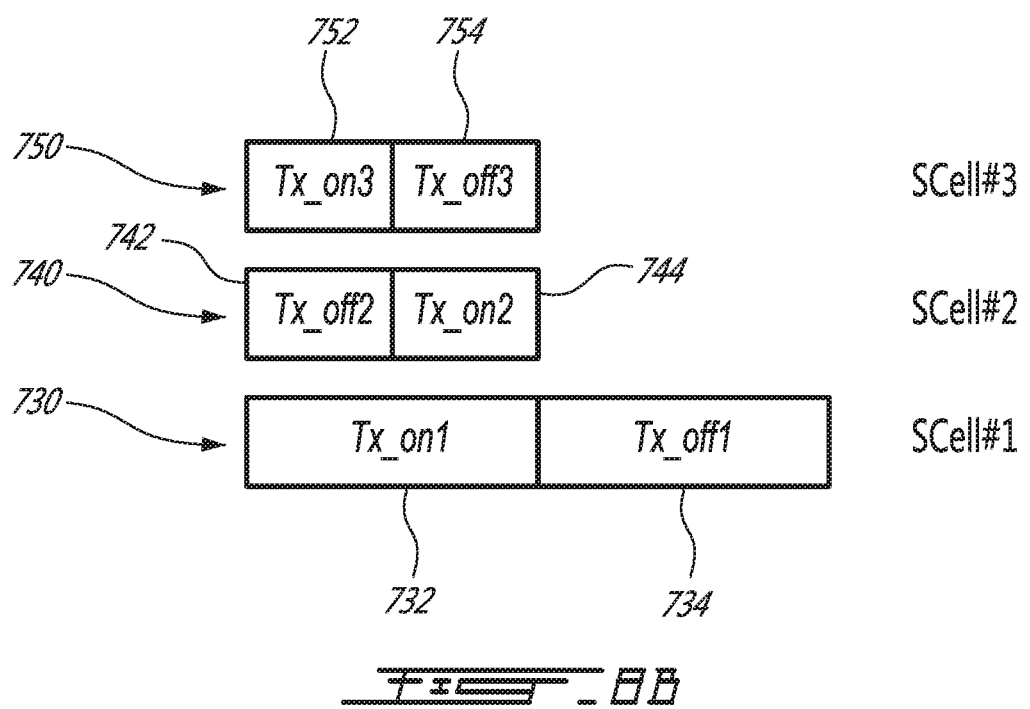

FIG. 8B shows another example of transmit OFF coordination for three secondary cells SCell1, SCell2, SCell3. In that example, the transmit OFF durations 742, 754 for SCell2 and SCell3 are alternated similarly to the example of FIG. 8A but in addition, the transmit OFF durations 742, 754 are configured to span the entire transmit ON duration 730 used in SCell. With that arrangement, at least one secondary cell SCell1, SCell2, SCell3 is configured to monitor the channel at any given time, thereby improving the likelihood of detecting radar signals in the channel.

In general, for an arrangement with n secondary cells, the transmit ON duration (over which a first secondary cell SCell1 is transmitting) can be partitioned into n−1 intervals and the transmit OFF duration for the $i^{th}$ Scell (i.e. Tx_off(i)) can be given by Tx_off(i)=q(i)×Tx_on1 where q(i)∈[0,1] and $\Sigma_{i=1}^{n-1} q(i)=1$. The start of the $i^{th}$ transmit OFF interval will occur at time $\Sigma_{j=1}^{i-1} q(i)$.

In some multiple secondary cell implementations, the node (e.g. an access node in a primary cell) controlling transmissions in each secondary cell is configured to follow one of the pulse detection and transmit OFF extension methods described above while maintaining alignment of the transmit OFF durations to ensure at least one secondary cell is monitoring at any given time. In one implementation, if a radar signal is detected in one secondary cell (e.g. with a sufficient number of pulses), the node is configured to stop transmissions in all of the cells under its control for a predetermined period (e.g. 30 minutes).

In other implementations, instead of maintaining alignment of the transmit OFF durations, the node controlling transmissions in each secondary cell is configured to follow one of the pulse detection and transmit OFF extension methods described above but align the start and duration of the transmit ON durations to ensure that the secondary cells are all monitoring for radar pulses at same time. In one implementation, if a radar signal is detected (e.g. with a sufficient number of pulses) in one cell, the node is configured to stop transmissions in all of the cells for a predetermined period (e.g. 30 minutes).

In yet other implementations where a node controls transmissions in multiple secondary cells, the node is configured to monitor for pulses in each cell. Upon detecting one or more pulses in one secondary cell (e.g. sCell1), the node is configured stop transmissions in that cell for a period (e.g. $T_{sCell1}$ which could be up to 12 seconds) and enter into a monitoring mode to detect a sufficient number of pulses. Alternatively, instead of entering into a monitoring mode, the node may be configured to continue to allow transmissions in the cell but follow one of the pulse detection and transmit OFF extension methods described above by for example, progressively increasing/decreasing either the transmit ON duration or duty cycle over a defined period or number of frames (DFS count). The intervals over which the transmit ON duration or duty cycle are adaptively increased or decreased can be network configured and can, for example, be a multiple of 1 msec LTE frames. In order to reduce the impact on network throughput, the node may be further configured to transmit the data scheduled for transmission in a different secondary cell (e.g. SCell2) which, in some implementations, may be configured to operate in a different, non-interfering channel.

In some implementations, to further improve detection accuracy, the access node is further configured to inform or notify wireless devices within its coverage (e.g. within coverage of a primary and/or secondary cell) that a radar signal is in the process of being detected.

In one example, when a number of radar pulses is detected in a band or channel used in a secondary cell, the access node is configured to send a message to wireless devices or UEs in that cell to request that they stop or reduce their (uplink) transmissions to a defined level until the access node can finally determine whether a radar signal is actually present or not. If the UEs continue to transmit, the access node may not be able to properly detect the radar signal and/or may incorrectly detect a radar signal (e.g. a false positive). It is desirable in these cases to instruct or request UEs to stop transmitting as soon as possible to facilitate completion of the detection process as described herein for more accurate radar detection.

The access node may notify UEs in its coverage in many different ways. In one implementation, the message sent includes an indication of an on-going radar detection and/or an indication of a number of radar pulsed detected. In another implementation, the message includes a request or instruction indication to stop transmitting or reduce a transmission level below a defined threshold. Other possibilities exist for the indication.

There are many possibilities for the type of message used to send the indication. For example, the indication could be sent in a Radio Resource Control (RRC) message. In yet another implementation, the indication is sent periodically in a message that is decoded by each UE in the cell, irrespective of the UE's connection and/or synchronization status. For example, the indication could be sent in a broadcast message such as a Master Information Bloc (MIB) or System Information Block (SIB) message. In yet another implementation, the indication could be sent encoded in a reference signal such as, for example, a Discovery Reference Signal (DRS). Sending the indication in a broadcast message or a reference signal enables the access node to notify all UEs in the cell, including UEs that are attempting to synchronize, establish a connection and/or perform a Random Access (RA) procedure to connect to the access node. Any one of these activities may otherwise interfere with the access node's ability to properly perform radar detection as described herein.

In some implementations, upon receiving a message indicating that a radar signal is in the process of being detected and/or a request to stop transmitting, the UEs within the coverage area of the access node are each configured to stop transmitting or cease any procedure that might otherwise cause an uplink transmission that may interfere with the access node's ability to properly detect a radar signal. Examples of such procedures include synchronization, random access (RA), RRC connection, etc.

FIGS. 9A-B are block diagrams of exemplary embodiments of respectively an access node 1000 and a wireless device (such as those described in relation to FIGS. 1-8)) configured to control transmissions in a first wireless network (e.g. an LTE network) in a frequency band used for contention-based transmissions in another wireless network (e.g. LAA, LTE-U or a Wi-Fi network) in accordance with the principles of the present disclosure.

As illustrated in FIG. 9A, access node 1000 includes a transceiver 1002, one or more processor(s) 1004, memory 1006 which includes a detection module 1008, an extension module 1010 and a transmission management module 1012. In one embodiment, the transceiver 1002 may be replaced by a transmitter and a receiver (not shown). The detection module 1006 is configured to perform the detection functionality described above which, as noted above includes monitoring for and/or detecting radar pulses during the transmit OFF duration of transmission cycles. The extension module 1010 is configured to perform the transmit OFF duration extension functionality described above, which includes extending the transmit OFF duration of transmission cycle(s) when one or more radar pulsed has been detected. The transmission management module 1012 is configured to perform the notification functionality described above which includes sending an indication to wireless device(s) within coverage (or within coverage of a primary and/or secondary cell) that a radar signal is in the process of being detected and/or requesting the wireless device(s) to stop transmitting.

The detection module 1008, extension module 1010 and the transmission management module 1012 are implemented at least partially in the memory 1006 in the form of software or (computer-implemented) instructions executed by the processor(s) 1004 within the access node 1000 or distributed across two or more nodes (e.g., the access node 1000 and another node). In another example, the processor(s) 1004 includes one or more hardware components (e.g., Application Specific Integrated Circuits (ASICs)) that provide some or all of the determination, estimation and adjustment functionality described above. In another embodiment, the processor(s) 1004 include one or more hardware components (e.g., Central Processing Units (CPUs)), and some or all of the detection, extension and notification functionality described above is implemented in software stored in, e.g., the memory 1006 and executed by the processor 1004. In yet another embodiment, the processor(s) 1004 and memory 1006 form processing means (not shown) configured to perform the detection, extension and notification functionality described above.

As illustrated in FIG. 9B, wireless device 1100 includes a transceiver 1102, one or more processor(s) 1104, memory 1106 which includes a transmission management module 1108. In one embodiment, the transceiver 1102 may be replaced by a transmitter and a receiver (not shown). The transmission management module 1108 is configured to perform the transmission management functionality described above which, as noted above includes receiving an indication from an access node that a radar signal is in the process of being detected and/or requesting the wireless device to stop transmitting and based on that indication, and based on the indication received, ceasing transmissions for a predetermined time.

The transmission management module 1108 is implemented at least partially in the memory 1106 in the form of software or (computer-implemented) instructions executed by the processor(s) 1104 within the wireless device 1100 or distributed across two or more nodes (e.g., the wireless device 1100 and another node or device). In another example, the processor(s) 1104 includes one or more hardware components (e.g., Application Specific Integrated Circuits (ASICs)) that provide some or all of the transmission management functionality described above. In another embodiment, the processor(s) 1104 include one or more hardware components (e.g., Central Processing Units (CPUs)), and some or all of the transmission management functionality described above is implemented in software stored in, e.g., the memory 1106 and executed by the processor 1104. In yet another embodiment, the processor(s) 1104 and memory 1106 form processing means (not shown) configured to perform the transmission management functionality described above.

FIGS. 10A-B show a variant for each of the access node and wireless device examples of FIGS. 9A-B, denoted respectively as access node 1200, and wireless device 1300. Each of the node 1200 and device 1300 includes a transceiver 1202, 1302 and circuitry containing (computer-implemented) instructions which when executed by one or more processor(s) 11204, 1304 cause their respective node 1200 and device 1300 to perform some or all of their respective functionality described above. In yet another variant, the circuitry includes the respective memory 1206, 1306 and processor(s) 1204, 1304 which, similarly to the example access node 1000 and device 1100 of FIGS. 8A-B may be implemented in many different ways. In one example, the memories 1206, 1306 contain instructions which, when executed, cause the respective node 1200 and device 1300 to perform some or all of their respective functionality described above. Other implementations are possible.

Other Embodiments

The following is also noted in accordance with other contemplated embodiments.

In one broad aspect of the present disclosure, there is provided a method for a network node configured to control wireless transmissions between the node and wireless devices in a wireless network using a transmission cycle pattern defined by a transmit on time and a transmit off time, where the wireless transmissions occur in a frequency band used for radar transmissions. The method includes after a wireless transmission during the transmit-on time of a first transmission cycle, detecting, during the transmit-off time of the first transmission cycle, at least one radar pulse in the frequency band and extending the transmit off time of a second transmission cycle based on the at least one radar pulse detected. The second transmission cycle may be the same as the first transmission cycle or a subsequent transmission cycle.

In one implementation, extending the transmit off time of the second transmission cycle includes reducing the transmit-on time of the second transmission cycle, reducing a duty cycle of the second transmission cycle or extending a transmission cycle period for the second transmission cycle. In another implementation, the method also includes detecting a number of radar pulses in a transmit off time of the second transmission cycle and prohibiting wireless transmissions for a predetermined time when the number of radar pulses detected is greater than a threshold.

In yet another implementation, the transmit off time of the second transmission cycle is extended by a first duration and the method further includes extending a transmit off time of a third transmission cycle by a second duration greater than the first duration when a number of radar pulses detected in a transmit off time of the second transmission cycle is lower than a threshold. In yet another implementation, the method further includes repeating the detecting and extending steps until one of the transmit off time is greater than a maximum transmit off time and the at least one radar pulse detected is greater than a threshold.

In yet another implementation, the method also includes repeating the detecting and extending steps for a predetermined number of times which may be dependent on a type of the at least one radar pulse detected. In one example, after the predetermined number of times, the method may include resetting a transmit off time of a subsequent transmission cycles when a number of the at least one radar pulse detected is lower than a threshold. In another example, after the predetermined number of times, the method may include incrementally reducing a transmit off time of one or more subsequent transmission cycles when a number of the at least one radar pulse detected is lower than a threshold until the transmit off time reaches a reset value.

In yet another implementations, detecting the at least one radar pulse includes detecting the at least one radar pulse in a channel of the frequency band overlapping with a channel used for the wireless transmission. In yet another implementation, the detecting and extending is performed for at least one secondary cell in which a channel used for wireless transmissions in the frequency band overlaps with a channel used for radar transmissions. In one example, detecting at least one radar pulse in the frequency band includes detecting the at least one radar pulse in one of the at least one secondary cell, and the method may further include prohibiting wireless transmissions for a predetermined time in each of the at least one secondary cells when the at least one radar pulse detected is greater than a threshold. In another example, extending the transmit off time includes extending the transmit off time in each of the at least one secondary cell such that the transmit on times in the at least one secondary cell do not overlap.

In yet another implementation, the method further includes sending a message to one or more wireless devices, the message being indicative of the at least one radar pulse detected or indicative of a request to stop transmitting. The message may be sent in a broadcast channel, a control channel, a traffic channel, in a Master Information Block (MIB), a System Information Block (SIB) or a reference signal.

In another broad aspect of the present disclosure, there is provided a network node configured to control wireless transmissions between the node and wireless devices in a wireless network using a transmission cycle pattern defined by a transmit on time and a transmit off time, where the wireless transmissions occur in a frequency band used for radar transmissions. The node includes circuitry containing instructions which, when executed, cause the node to perform any of the steps and/or method embodiments described above.

In yet another broad aspect of the present disclosure, there is provided a non-transitory computer readable memory configured to store executable instructions for a network node, the executable instructions when executed by a processor cause the node to perform any of the steps and/or method embodiments described above.

In another broad aspect of the present disclosure, there is provided a network node configured to control wireless transmissions between the node and wireless devices in a wireless network using a transmission cycle pattern defined by a transmit on time and a transmit off time, and where the wireless transmissions occur in a frequency band used for radar transmissions. The node includes a transceiver, a processor and memory containing a detection module configured to detect, after a wireless transmission during the transmit-on time of a first transmission cycle and during the transmit-off time of the first transmission cycle, at least one radar pulse in the frequency band. The memory further contains an extension module configured to extend the transmit off time of a second transmission cycle based on the at least one radar pulse detected. The second transmission cycle may be the same as the first transmission cycle or a subsequent transmission cycle.

In one implementation, the extension module is configured to extend the transmit off time of the second transmission cycle by either reducing the transmit-on time of the second transmission cycle, reducing a duty cycle of the second transmission cycle or extending a transmission cycle period for the second transmission cycle. In another implementation, the detection module is further configured to detect a number of radar pulses in a transmit off time of the second transmission cycle and prohibit wireless transmissions for a predetermined time when the number of radar pulses detected is greater than a threshold. In yet another implementation, the transmit off time of the second transmission cycle is extended by a first duration, and the extension module is further configured to extend a transmit off time of a third transmission cycle by a second duration greater than the first duration when a number of radar pulses detected in a transmit off time of the second transmission cycle is lower than a threshold. In yet another implementation, the detection and extension modules are configured to repeat the detecting and extending until one of the transmit off time is greater than a maximum transmit off time and the at least one radar pulse detected is greater than a threshold. In yet another implementation, the detection and extension modules are configured to repeat the detecting and extending for a predetermined number of times which may be dependent on a type of the at least one radar pulse detected.

In yet another implementation, the extension module is configured to, after the predetermined number of times, reset a transmit off time of a subsequent transmission cycles when a number of the at least one radar pulse detected is lower than a threshold. In yet another implementation, the extension module is further configured to, after the predetermined number of times, incrementally reduce a transmit off time of one or more subsequent transmission cycles when a number of the at least one radar pulse detected is lower than a threshold until the transmit off time reaches a reset value.

In yet another implementation, in order to detect the at least one radar pulse, the detection module is further configured to detect the at least one radar pulse in a channel of the frequency band overlapping with a channel used for the wireless transmission. In yet another implementation, the detection module is further configured to detect and extend for at least one secondary cell in which a channel used for wireless transmissions in the frequency band overlaps with a channel used for radar transmissions. In one example, to detect at least one radar pulse in the frequency band, the detection module may be further configured to cause the node to detect the at least one radar pulse in one of the at least one secondary cell, and to prohibit wireless transmissions for a predetermined time in each of the at least one secondary cells when the at least one radar pulse detected is greater than a threshold. In another example, to extend the transmit off time, the extension module may be further configured to extend the transmit off time in each of the at least one secondary cell such that the transmit on times in the at least one secondary cell do not overlap.

In yet another implementation, the memory further contains a transmission module configured to send a message to one or more wireless devices, indicative of the at least one radar pulse detected or a request to stop transmitting. The message may be sent in a broadcast channel, a control channel, a traffic channel, in a Master Information Block (MIB), a System Information Block (SIB) or a reference signal.

It will be appreciated by persons skilled in the art that the present disclosure is not limited to the examples shown and described herein above. A variety of modifications and variations are possible in light of the above teachings.

What is claimed is:

1. A method for a network node configured to control wireless transmissions between the network node and wireless devices in a wireless network using a transmission cycle pattern defined by a transmit on time and a transmit off time, the wireless transmissions occurring in a frequency band used for transmissions of higher priority repetitive signals or pulses, the method comprising:
after a wireless transmission during a transmit on time of a first transmission cycle, detecting, during a transmit off time of the first transmission cycle, at least one higher priority repetitive signal or pulse in the frequency band; and
extending the transmit off time of the first transmission cycle and/or at least one subsequent transmission cycle based on the at least one higher priority repetitive signal or pulse detected.

2. The method of claim 1 wherein the at least one higher priority repetitive signal or pulse detected in the frequency band is at least one radar pulse detected in the frequency band such that detecting the at least one higher priority repetitive signal or pulse in the frequency band comprises detecting, during the transmit off time of the first transmission cycle, the at least one radar pulse in the frequency band.

3. The method of claim 2 wherein extending the transmit off time of the first transmission cycle and/or the at least one subsequent transmission cycle comprises extending the transmit off time of the first transmission cycle.

4. The method of claim 2 wherein extending the transmit off time of the first transmission cycle and/or the at least one subsequent transmission cycle comprises extending the transmit off time of the at least one subsequent transmission cycle.

5. The method of claim 2 wherein extending the transmit off time of the first transmission cycle and/or the at least one subsequent transmission cycle comprises extending the transmit off time of the first transmission cycle and the transmit off time of the at least one subsequent transmission cycle.

6. The method of claim 2 wherein extending the transmit off time of the first transmission cycle and/or the at least one subsequent transmission cycle comprises one of reducing the transmit on time of the first transmission cycle and/or the at least one subsequent transmission cycle, reducing a duty cycle of the first transmission cycle and/or the at least one subsequent transmission cycle, and extending a transmission cycle period for the first transmission cycle and/or the at least one subsequent transmission cycle.

7. The method of claim 2 further comprising detecting a number of radar pulses in the transmit off time of the first transmission cycle and/or the at least one subsequent transmission cycle and prohibiting wireless transmissions for a predetermined time when the number of radar pulses detected is greater than a threshold.

8. The method of claim 2 wherein:
extending the transmit off time of the first transmission cycle and/or at least one subsequent transmission cycle comprises extending the transmit off time of a first subsequent transmission cycle by a first duration; and
the method further comprises extending a transmit off time of a second subsequent transmission cycle by a second duration greater than the first duration when a number of radar pulses detected in the transmit off time of the first subsequent transmission cycle is lower than a threshold, wherein the second subsequent transmission cycle is subsequent to the first subsequent transmission cycle.

9. The method of claim 2 further comprising repeating the detecting and extending steps until one of the transmit off time is greater than a maximum transmit off time and a number of radar pulses detected is greater than a threshold.

10. The method of claim 2 further comprising repeating the detecting and extending steps for a predetermined number of times.

11. The method of claim 10 wherein the predetermined number of times is dependent on a type of the at least one radar pulse detected.

12. The method of claim 10 further comprising after the predetermined number of times, resetting a transmit off time of a subsequent transmission cycle when a number of the at least one radar pulse detected is lower than a threshold.

13. The method of claim 10 further comprising after the predetermined number of times, incrementally reducing a transmit off time of one or more subsequent transmission cycles when a number of the at least one radar pulse detected is lower than a threshold until the transmit off time reaches a reset value.

14. The method of claim 2 wherein detecting the at least one radar pulse comprises detecting the at least one radar pulse in a channel of the frequency band overlapping with a channel used for the wireless transmission.

15. The method of claim 2 wherein the detecting and extending is performed for at least one secondary cell in which a channel used for wireless transmissions in the frequency band overlaps with a channel used for radar transmissions.

16. The method of claim 15 wherein detecting at least one radar pulse in the frequency band comprises detecting the at least one radar pulse in one of the at least one secondary cell, the method further comprising prohibiting wireless transmissions for a predetermined time in each of the at least one secondary cell when the at least one radar pulse detected is greater than a threshold.

17. The method of claim 15 wherein extending the transmit off time comprises extending the transmit off time in each of the at least one secondary cell such that the transmit on times in the at least one secondary cell do not overlap.

18. The method of claim 15 further comprising sending a message to one or more wireless devices, the message being indicative of the at least one radar pulse detected.

19. The method of claim 15 further comprising sending a message to one or more wireless devices, the message being indicative of a request to stop transmitting.

20. The method of claim 18 wherein the message is sent in one of a broadcast channel, a control channel, and a traffic channel.

21. The method of claim 18 wherein the message is sent in one of a Master Information Block, MIB, a System Information Block, SIB, and a reference signal.

22. A network node configured to control wireless transmissions between the network node and wireless devices in a wireless network using a transmission cycle pattern defined by a transmit on time and a transmit off time, the wireless transmissions occurring in a frequency band used for transmissions of higher priority repetitive signals or pulses, the network node comprising circuitry containing instructions which, when executed, cause the network node to:
after a wireless transmission during a transmit on time of a first transmission cycle, detect, during a transmit off time of the first transmission cycle, at least one higher priority repetitive signal or pulse in the frequency band; and extend the transmit off time of the first transmission cycle and/or at least one subsequent transmission cycle based on the at least one higher priority repetitive signal or pulse detected.

23. The network node of claim 22 wherein the at least one higher priority repetitive signal or pulse detected in the frequency band is at least one radar pulse detected in the frequency band such that the instructions are configured to cause the network node to detect, during the transmit off time of the first transmission cycle, the at least one radar pulse in the frequency band.

24. The network node of claim 23 wherein the instructions are configured to cause the network node to extend the transmit off time of the first transmission cycle.

25. The network node of claim 23 wherein the instructions are configured to cause the network node to extend the transmit off time of the at least one subsequent transmission cycle.

26. The network node of claim 23 wherein the instructions are configured to cause the network node to extend the transmit off time of the first transmission cycle and the transmit off time of the at least one subsequent transmission cycle.

27. The network node of claim 23 wherein the instructions are further configured to cause the network node to extend the transmit off time of the first transmission cycle and/or the at least one subsequent transmission cycle by one of reducing the transmit on time of the first transmission cycle and/or the at least one subsequent transmission cycle, reducing a duty cycle of the first transmission cycle and/or the at least one subsequent transmission cycle, and extending a transmission cycle period for the first transmission cycle and/or the at least one subsequent transmission cycle.

28. The network node of claim 23 wherein the instructions are further configured to cause the network node to detect a number of radar pulses in the transmit off time of the first transmission cycle and/or the at least one subsequent transmission cycle and prohibit wireless transmissions for a predetermined time when the number of radar pulses detected is greater than a threshold.

29. The network node of claim 23 wherein:
the instructions are configured to cause the network node to extend the transmit off time of a first subsequent transmission cycle by a first duration; and
the instructions are further configured to cause the network node to extended a transmit off time of a second subsequent transmission cycle by a second duration greater than the first duration when a number of radar pulses detected in the transmit off time of the first subsequent transmission cycle is lower than a threshold, wherein the second subsequent transmission cycle is subsequent to the first subsequent transmission cycle.

30. The network node of claim 23 wherein the instructions are further configured to cause the network node to repeat the detecting and extending until one of the transmit off time is greater than a maximum transmit off time and a number of radar pulses detected is greater than a threshold.

31. The network node of claim 23 wherein the instructions are further configured to cause the network node to repeat the detecting and extending for a predetermined number of times.

32. The network node of claim 31 wherein the predetermined number of times is dependent on a type of the at least one radar pulse detected.

33. The network node of claim 31 wherein the instructions are further configured to cause the network node to after the predetermined number of times, reset a transmit off time of a subsequent transmission cycle when a number of the at least one radar pulse detected is lower than a threshold.

34. The network node of claim 31 wherein the instructions are further configured to cause the network node to, after the predetermined number of times, incrementally reduce a transmit off time of one or more subsequent transmission cycles when a number of the at least one radar pulse detected is lower than a threshold until the transmit off time reaches a reset value.

35. The network node of claim 23 wherein to detect the at least one radar pulse, the instructions are further configured to cause the network node to detect the at least one radar pulse in a channel of the frequency band overlapping with a channel used for the wireless transmission.

36. The network node of claim 23 wherein the instructions are further configured to cause the network node to detect and extend for at least one secondary cell in which a channel used for wireless transmissions in the frequency band overlaps with a channel used for radar transmissions.

37. The network node of claim 36 wherein to detect at least one radar pulse in the frequency band, the instructions are further configured to cause the network node to detect the at least one radar pulse in one of the at least one secondary cell, and to prohibit wireless transmissions for a predetermined time in each of the at least one secondary cell when the at least one radar pulse detected is greater than a threshold.

38. The network node of claim 36 wherein to extend the transmit off time, the instructions are further configured to cause the network node to extend the transmit off time in each of the at least one secondary cell such that the transmit on times in the at least one secondary cell do not overlap.

39. The network node of claim 23 wherein the instructions are further configured to cause the network node to send a message to one or more wireless devices, the message being indicative of the at least one radar pulse detected.

40. The network node of claim 23 wherein the instructions are further configured to cause the network node to send a message to one or more wireless devices, the message being indicative of a request to stop transmitting.

41. The network node of claim 39 wherein the message is sent in one of a broadcast channel, a control channel, and a traffic channel.

42. The network node of claim 39 wherein the message is sent in one of a Master Information Block, MIB, a System Information Block, SIB, and a reference signal.

43. A non-transitory computer readable memory configured to store executable instructions for a network node configured to control wireless transmissions between the network node and wireless devices in a wireless network using a transmission cycle pattern defined by a transmit on time and a transmit off time, the wireless transmissions occurring in a frequency band used for transmissions of higher priority repetitive signals or pulses, the executable instructions when executed by a processor cause the network node to:
after a wireless transmission during a transmit on time of a first transmission cycle, detect, during a transmit off time of the first transmission cycle, at least one higher priority repetitive signal or pulse in the frequency band; and
extend the transmit off time of the first transmission cycle and/or at least one subsequent transmission cycle based on the at least one higher priority repetitive signal or pulse detected.

* * * * *